(12) United States Patent
Gravelle et al.

(10) Patent No.: US 9,361,492 B2
(45) Date of Patent: Jun. 7, 2016

(54) MULTI-PROTOCOL RFID SYSTEM

(71) Applicant: Amtech Systems, LLC, Albuquerque, NM (US)

(72) Inventors: Kelly Gravelle, San Diego, CA (US); Steven J. Catanach, Rio Rancho, NM (US); Robert W. Tiernay, Albuquerque, NM (US); Joseph H. Kao, Albuquerque, NM (US); Michael Melville, Albuquerque, NM (US)

(73) Assignee: Amtech Systems, LLC, Albuquerque, NM (US)

( * ) Notice: Subject to any disclaimer, the term of this patent is extended or adjusted under 35 U.S.C. 154(b) by 0 days.

(21) Appl. No.: 14/808,696

(22) Filed: Aug. 12, 2015

(65) Prior Publication Data

US 2016/0004893 A1    Jan. 7, 2016

Related U.S. Application Data

(60) Continuation of application No. 14/623,278, filed on Feb. 16, 2015, which is a continuation of application No. 11/764,005, filed on Jun. 15, 2007, now Pat. No. 9,135,480, which is a division of application No. 10/887,320, filed on Jul. 9, 2004, now Pat. No. 7,548,153.

(51) Int. Cl.
*H04Q 5/22* (2006.01)
*G08B 13/14* (2006.01)
(Continued)

(52) U.S. Cl.
CPC .......... *G06K 7/10297* (2013.01); *G06K 7/0008* (2013.01); *G06K 7/016* (2013.01); *G06K 7/10069* (2013.01); *G06K 7/10356* (2013.01); *G07B 15/063* (2013.01)

(58) Field of Classification Search
CPC ................................. H04Q 5/22; G08B 13/14
USPC .......... 340/10.1–10.5, 572.1, 572.4; 370/252, 370/342; 455/61, 277.1; 380/24; 235/384
See application file for complete search history.

(56) References Cited

U.S. PATENT DOCUMENTS 4,511,887 A    4/1985    Fiore
4,739,328 A    4/1988    Koelle et al.
(Continued)

OTHER PUBLICATIONS

TransCore Newsroom, 1999 Archives, Sep. 27, 1999, "RFID and Bar Code in One Compact, Lightweight Intermec Scanner," http://transcore.com/newsroom/1999%20news/news990927.html.
(Continued)

*Primary Examiner* — Nam V Nguyen
(74) *Attorney, Agent, or Firm* — Caesar Rivise, PC

(57) ABSTRACT

A multi-protocol RFID interrogating system employs a synchronization technique (step-lock) for a backscatter RFID system that allows simultaneous operation of closely spaced interrogators. The multi-protocol RFID interrogating system can communicate with backscatter transponders having different output protocols and with active transponders including: Title 21 compliant RFID backscatter transponders; IT2000 RFID backscatter transponders that provide an extended mode capability beyond Title 21; EGO™ RFID backscatter transponders, SEGO™ RFID backscatter transponders; ATA, ISO, ANSI AAR compliant RFID backscatter transponders; and IAG compliant active technology transponders. The system implements a step-lock operation, whereby adjacent interrogators are synchronized to ensure that all downlinks operate within the same time frame and all uplinks operate within the same time frame, to eliminate downlink on uplink interference.

25 Claims, 23 Drawing Sheets

(51) Int. Cl.

| | | |
|---|---|---|
| *G08G 1/01* | (2006.01) | |
| *G06K 7/10* | (2006.01) | |
| *G06K 7/00* | (2006.01) | |
| *G06K 7/016* | (2006.01) | |
| *G07B 15/06* | (2011.01) | |

(56) References Cited

U.S. PATENT DOCUMENTS

| | | | |
|---|---|---|---|
| 4,782,345 A | 11/1988 | Landt | |
| 4,864,158 A | 9/1989 | Koelle et al. | |
| 4,999,636 A | 3/1991 | Landt et al. | |
| 5,030,807 A | 7/1991 | Landt et al. | |
| 5,295,064 A | 3/1994 | Malec et al. | |
| 5,485,520 A | 1/1996 | Chaum et al. | |
| 5,504,485 A | 4/1996 | Landt et al. | |
| 5,525,991 A * | 6/1996 | Nagura | G01S 13/751 235/384 |
| 5,528,222 A | 6/1996 | Moskowitz et al. | |
| 5,537,105 A | 7/1996 | Marsh et al. | |
| 5,550,547 A | 8/1996 | Chan et al. | |
| 5,581,249 A | 12/1996 | Yoshida | |
| 5,604,486 A | 2/1997 | Lauro et al. | |
| 5,606,322 A | 2/1997 | Allen et al. | |
| 5,606,323 A | 2/1997 | Heinrich et al. | |
| 5,673,037 A | 9/1997 | Cesar et al. | |
| 5,748,137 A | 5/1998 | d'Hont | |
| 5,751,220 A | 5/1998 | Ghaffari | |
| 5,802,105 A | 9/1998 | Tiedemann, Jr. et al. | |
| 5,864,545 A | 1/1999 | Gonikberg et al. | |
| 5,887,176 A | 3/1999 | Griffith et al. | |
| 5,889,489 A | 3/1999 | Friedman et al. | |
| 5,912,632 A | 6/1999 | Dieska et al. | |
| 5,939,984 A | 8/1999 | Brady et al. | |
| 5,940,006 A | 8/1999 | MacLellan et al. | |
| 5,942,987 A | 8/1999 | Heinrich et al. | |
| 5,943,617 A | 8/1999 | Nakamura | |
| 5,952,940 A | 9/1999 | Matsumoto | |
| 5,999,091 A | 12/1999 | Wortham | |
| 6,078,251 A | 6/2000 | Landt et al. | |
| 6,097,347 A | 8/2000 | Duan et al. | |
| 6,107,910 A | 8/2000 | Nysen | |
| 6,118,829 A | 9/2000 | North | |
| 6,121,880 A | 9/2000 | Scott et al. | |
| 6,169,474 B1 | 1/2001 | Greeff et al. | |
| 6,219,543 B1 | 4/2001 | Myers et al. | |
| 6,275,157 B1 | 8/2001 | Mays et al. | |
| 6,381,269 B1 | 4/2002 | Gradl et al. | |
| 6,476,708 B1 | 11/2002 | Johnson | |
| 6,486,769 B1 | 11/2002 | McLean | |
| 6,509,836 B1 | 1/2003 | Ingram | |
| 6,538,564 B1 | 3/2003 | Cole | |
| 6,617,962 B1 | 9/2003 | Horwitz et al. | |
| 6,677,852 B1 | 1/2004 | Landt | |
| 6,734,797 B2 | 5/2004 | Shanks et al. | |
| 6,856,802 B1 | 2/2005 | Kinnunen et al. | |
| 6,946,950 B1 | 9/2005 | Ueno et al. | |
| 6,975,228 B2 | 12/2005 | Wrasman et al. | |
| 6,988,667 B2 | 1/2006 | Stewart et al. | |
| 7,225,992 B2 | 6/2007 | Forster | |
| 7,253,719 B2 | 8/2007 | Diorio et al. | |
| 7,394,324 B2 | 7/2008 | Diorio et al. | |
| 7,592,898 B1 | 9/2009 | Ovard et al. | |
| 8,013,760 B2 * | 9/2011 | Turnock | G07B 15/063 340/10.1 |
| 9,135,480 B2 * | 9/2015 | Gravelle | G06K 7/0008 |
| 2001/0050922 A1 | 12/2001 | Tiernay et al. | |

OTHER PUBLICATIONS

TransCore Newsroom, 2002 Archives, Sep. 23, 2002 "TransCore's eGo Products Put Electronic Toll Collection and Vehicle Registration in High Gear," http://www.transcore.com/newsroom/2002%20news/news020921_2.html.

TC IP, Ltd., May 2003, "eGo Electronic Toll Collection and Electronic Vehicle Registration".

* cited by examiner

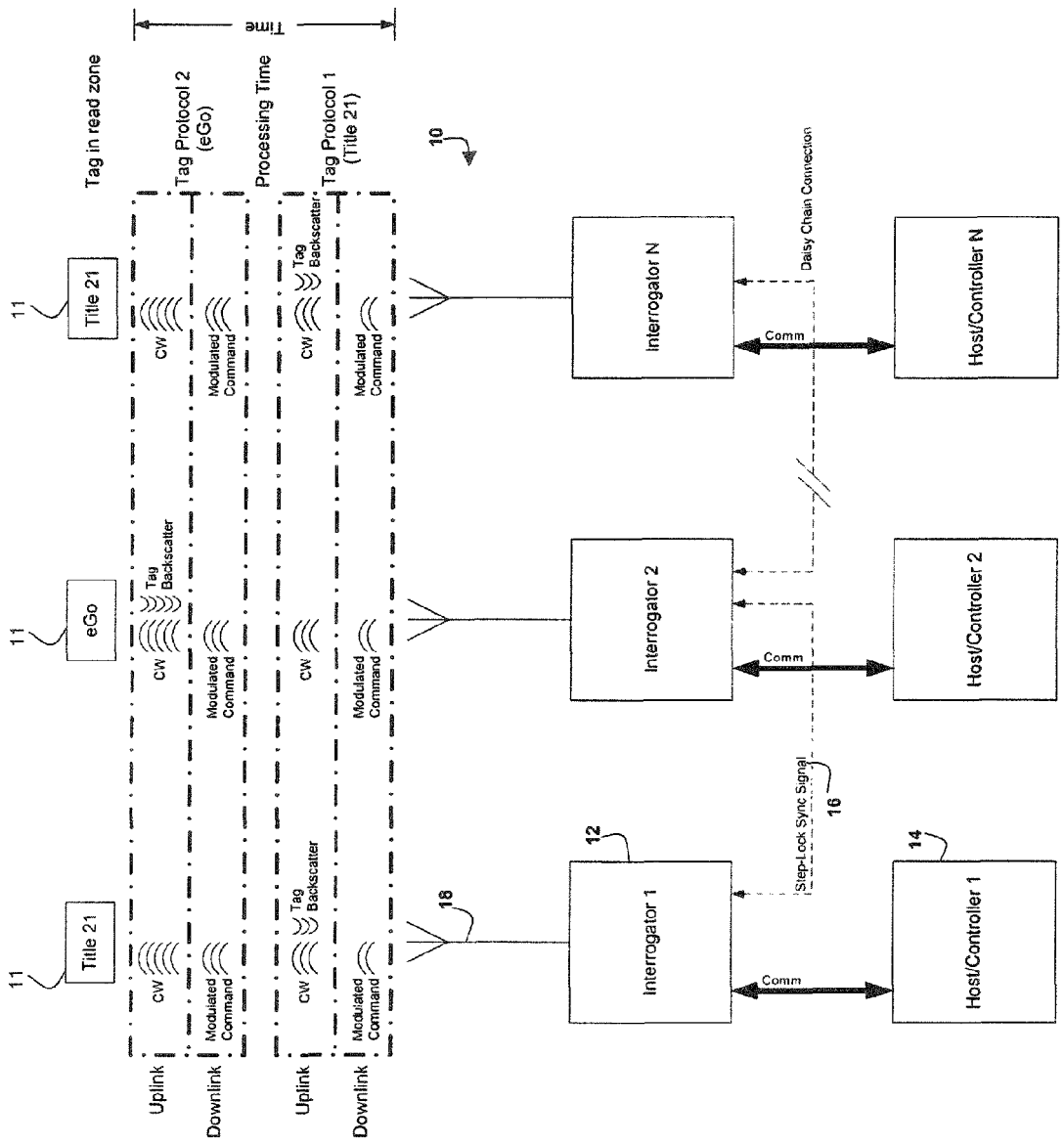
Figure 1 Step-Locked Interrogator Cluster (Internal Sync Signal)

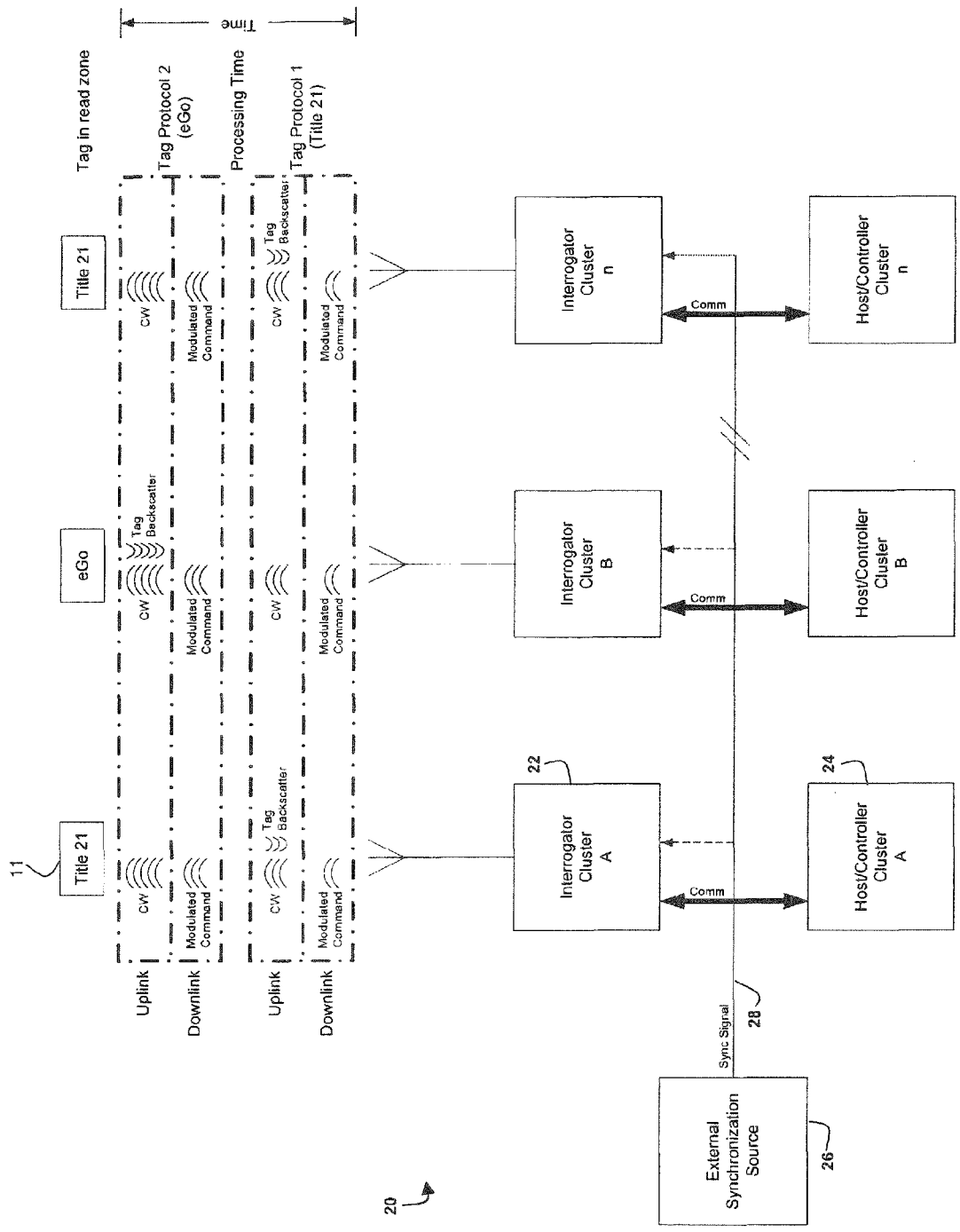
Figure 2 Step-Locked Interrogator Clusters (External Sync Signal)

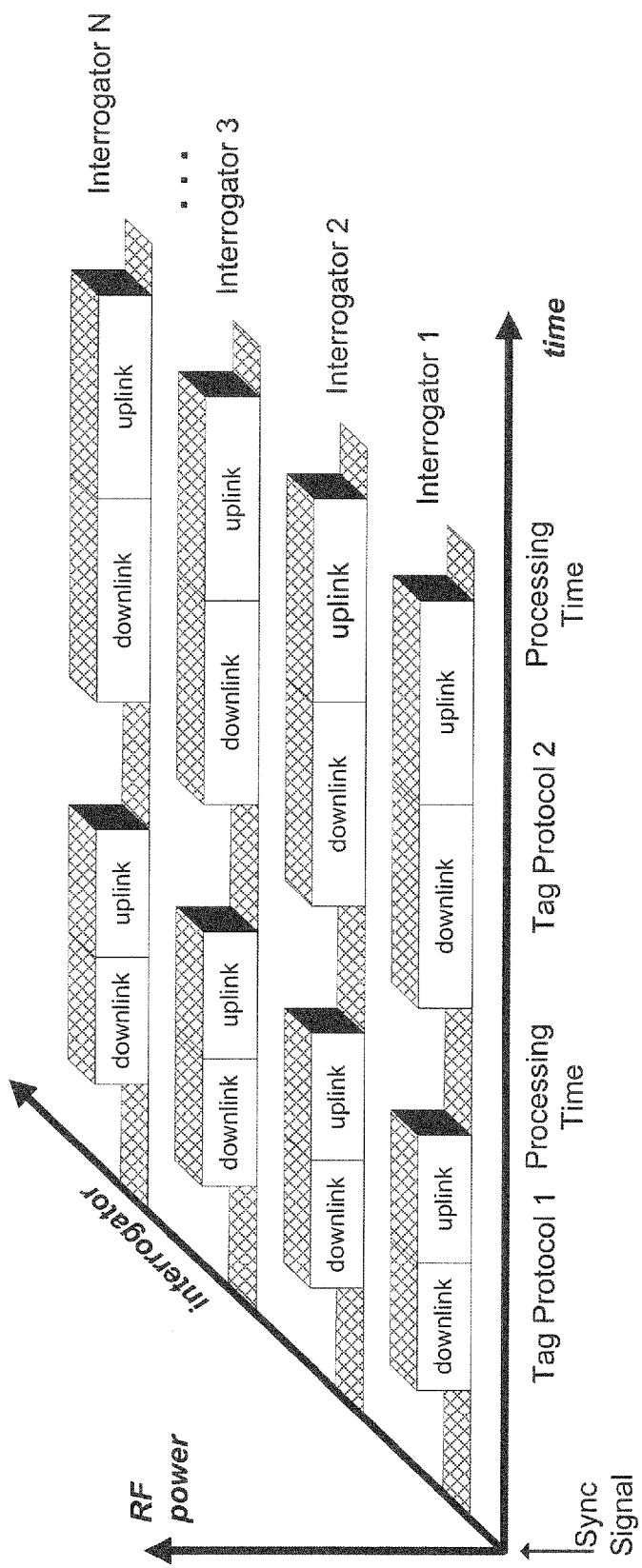
Figure 3(a) – Step Lock Timing Diagram

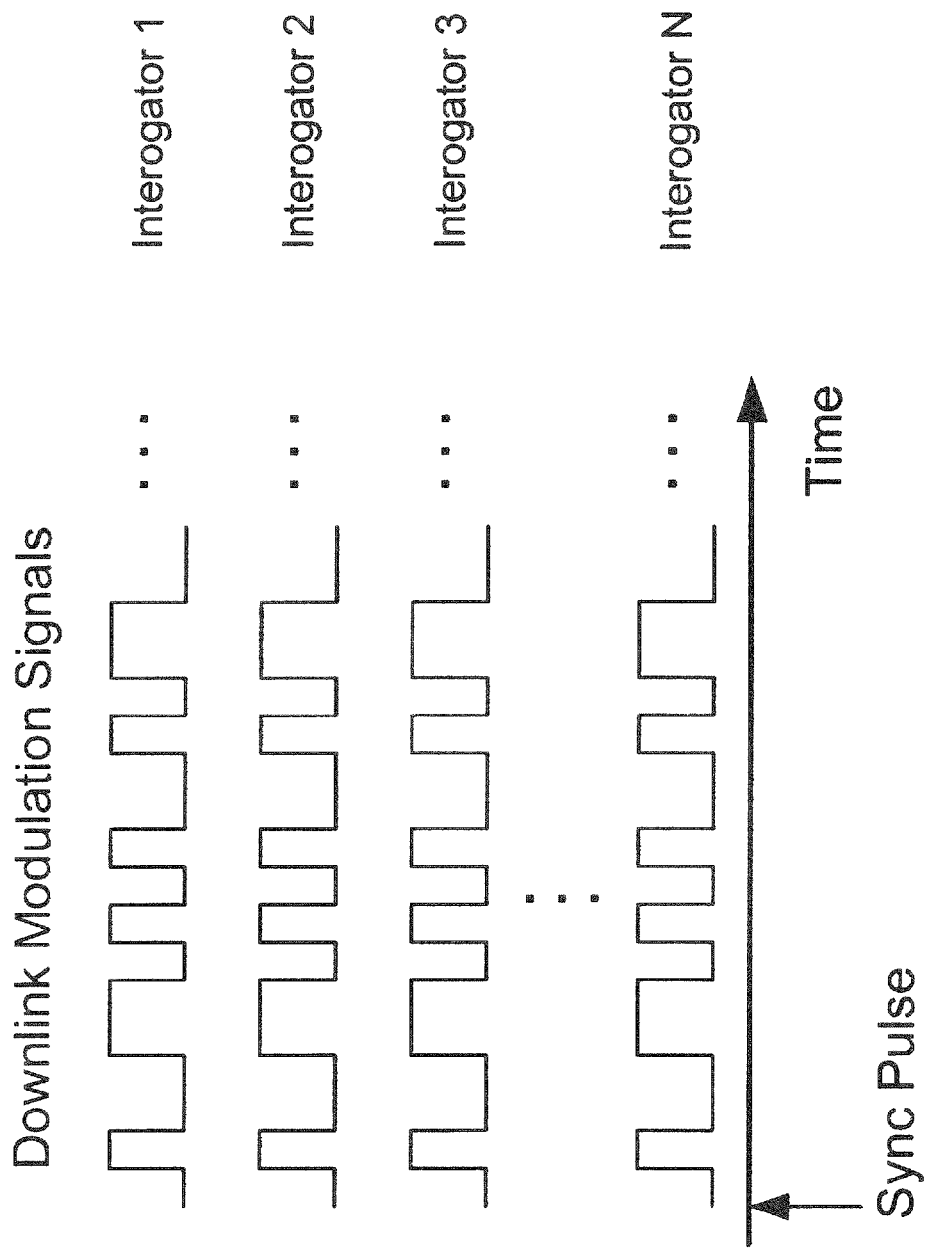
Figure 3(b) - Step Lock with Bit Synchronization

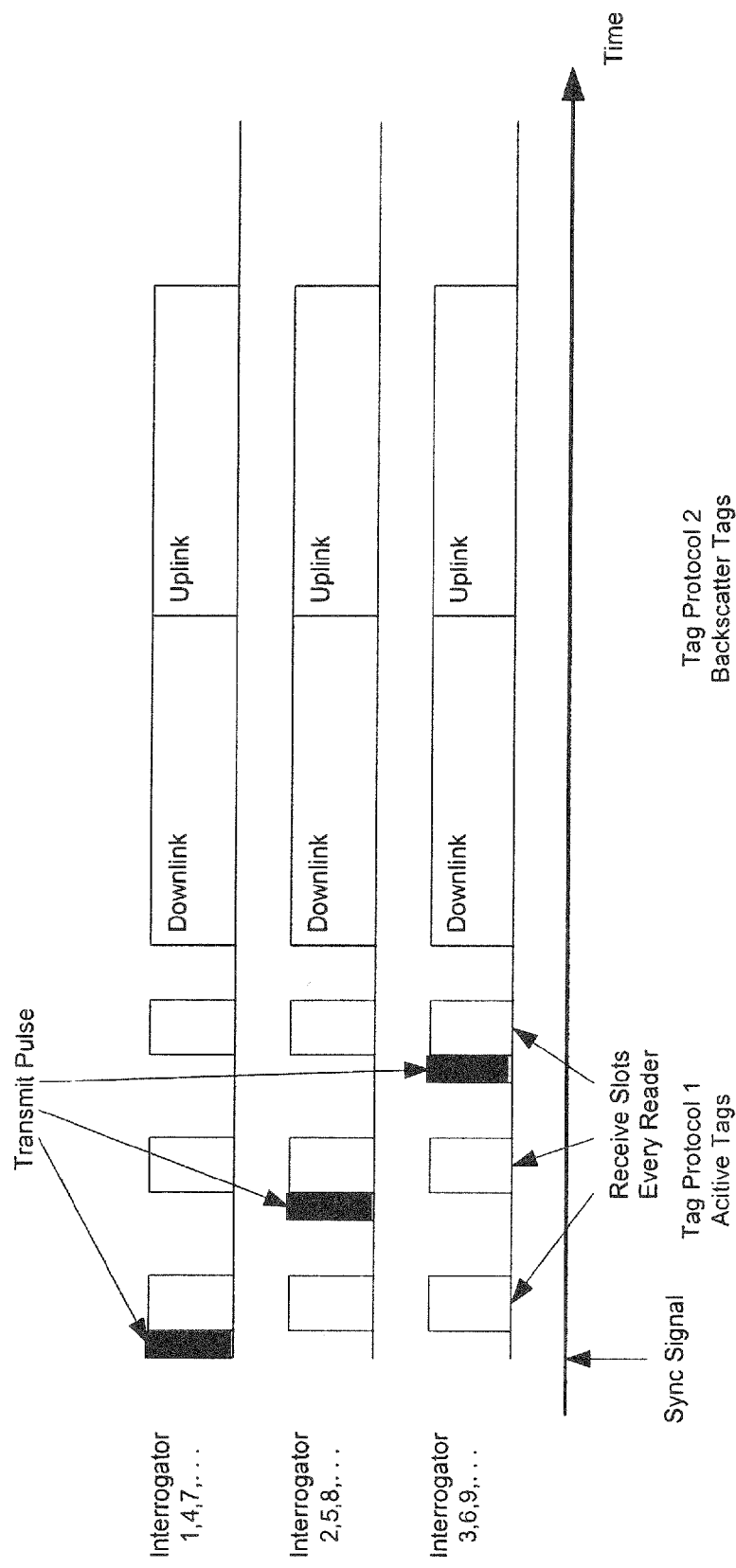
Figure 3(c) - Time Division Multiplexing and Step Lock Combination for Active and Backscatter

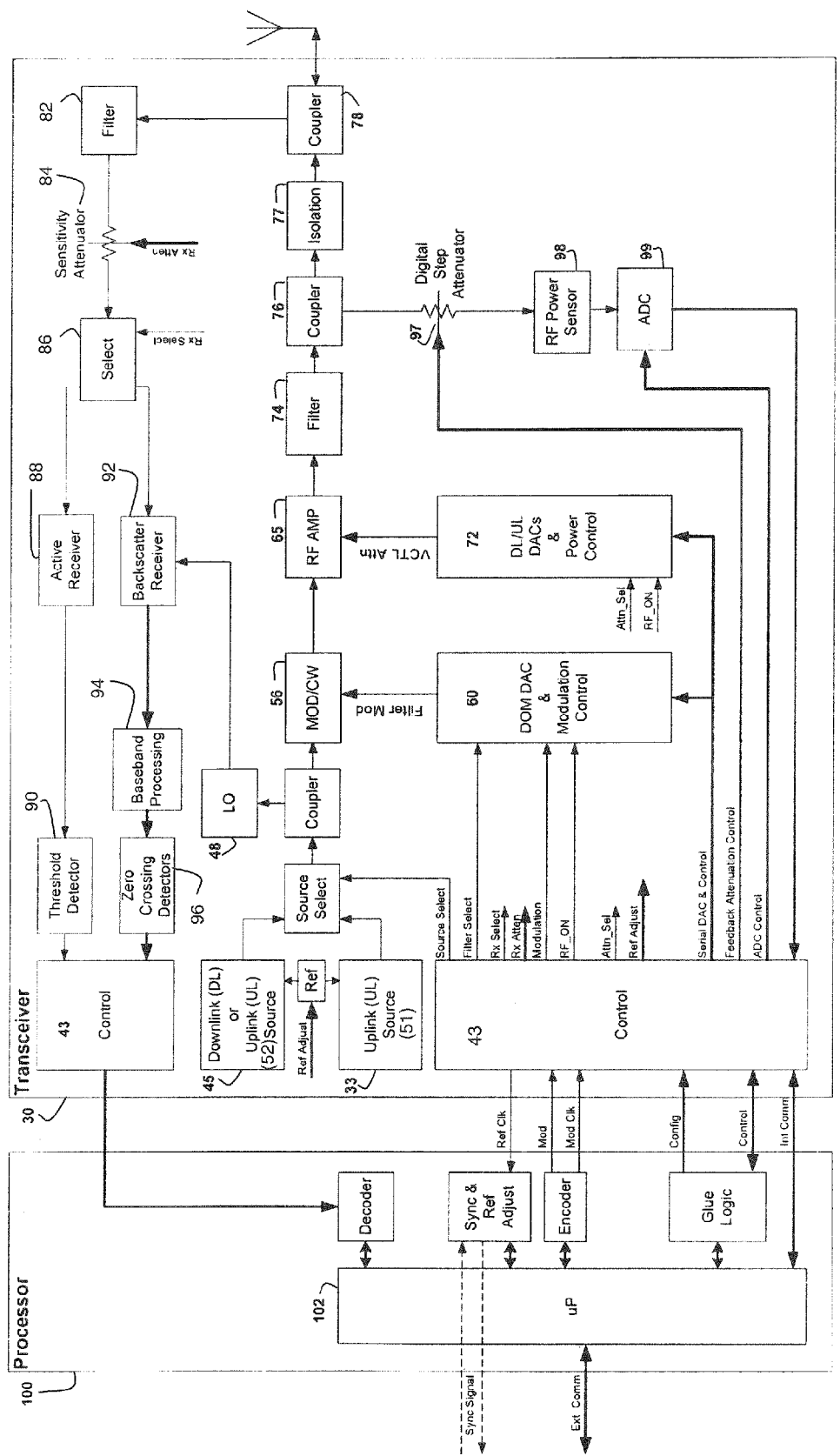
Figure 4 Interrogator Block Diagram

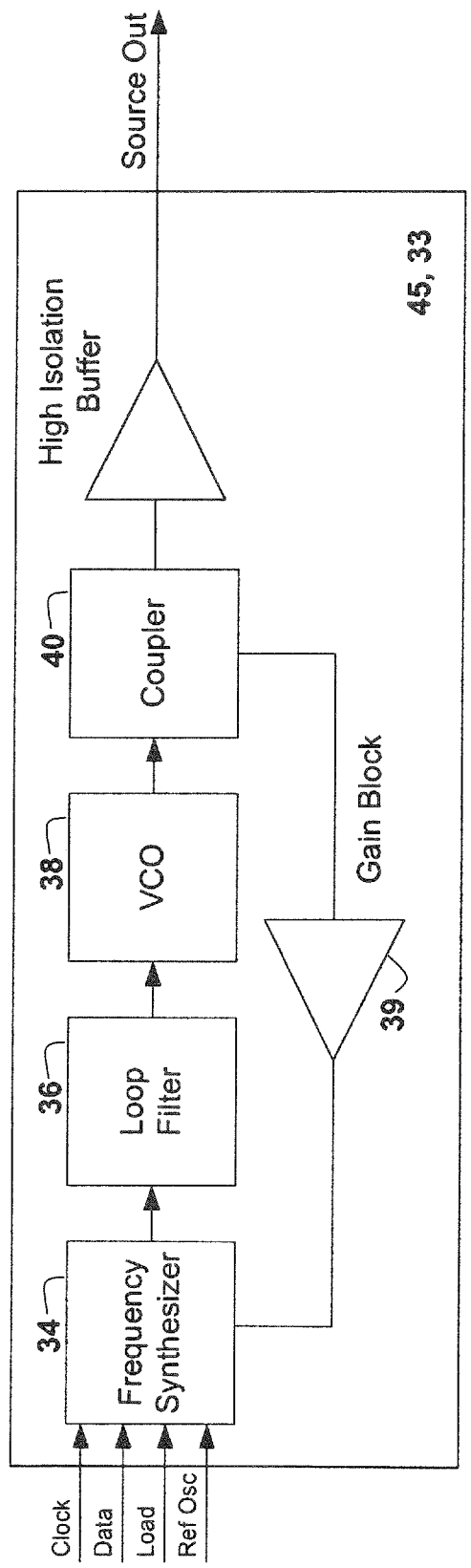
Figure 5 Synthesized Source Block Diagram

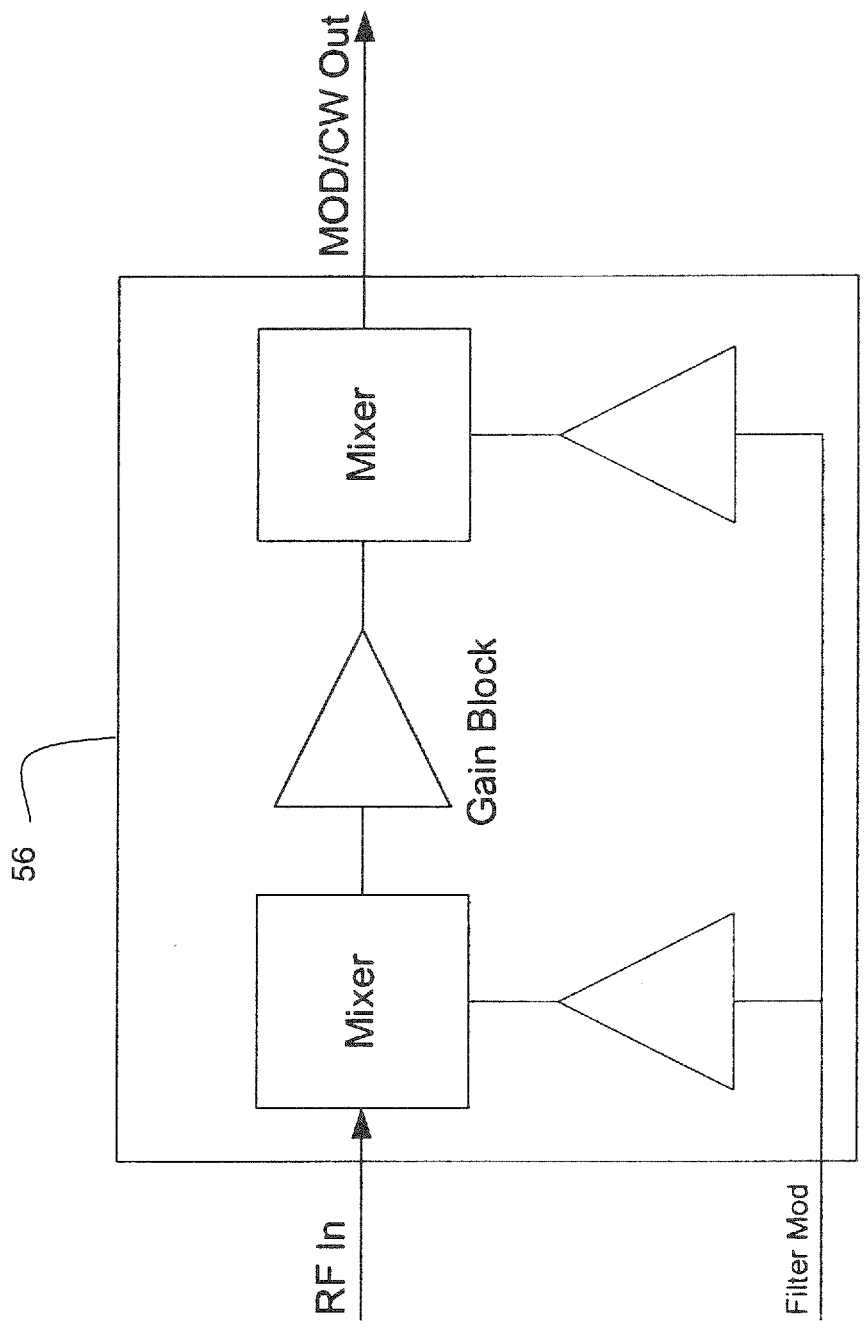
Figure 6 Dual Mixer Block Diagram

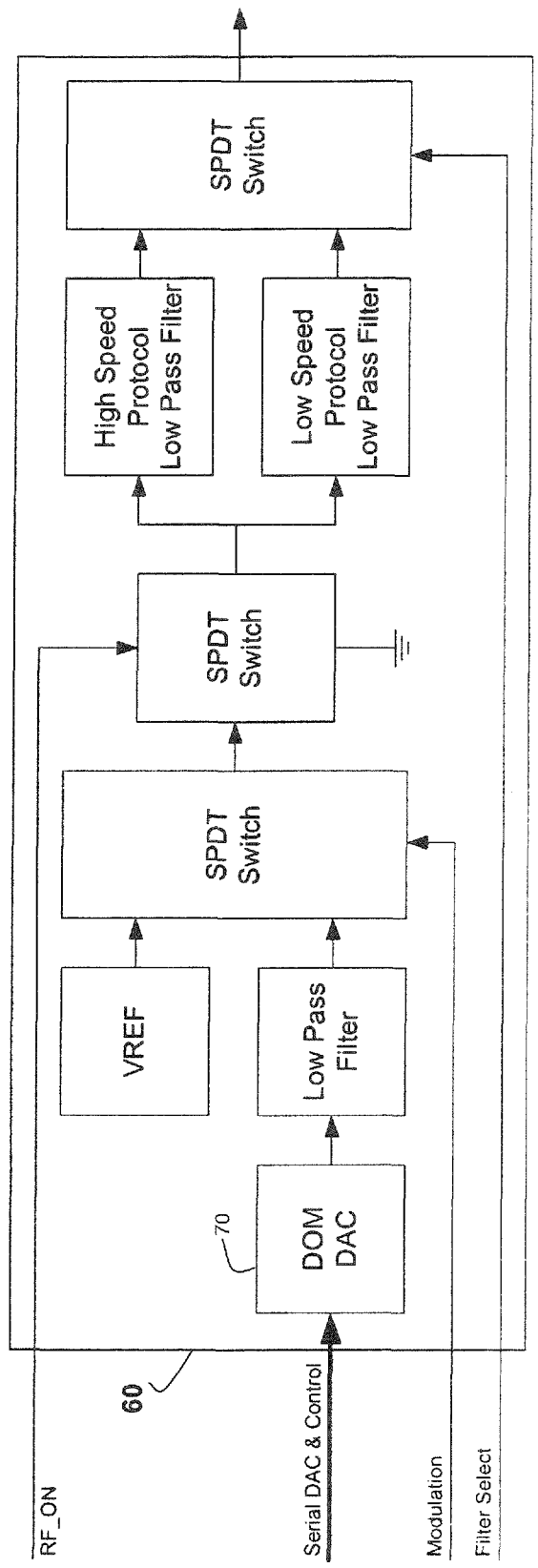
Figure 7 DOM DAC and Modulation Control Block Diagram

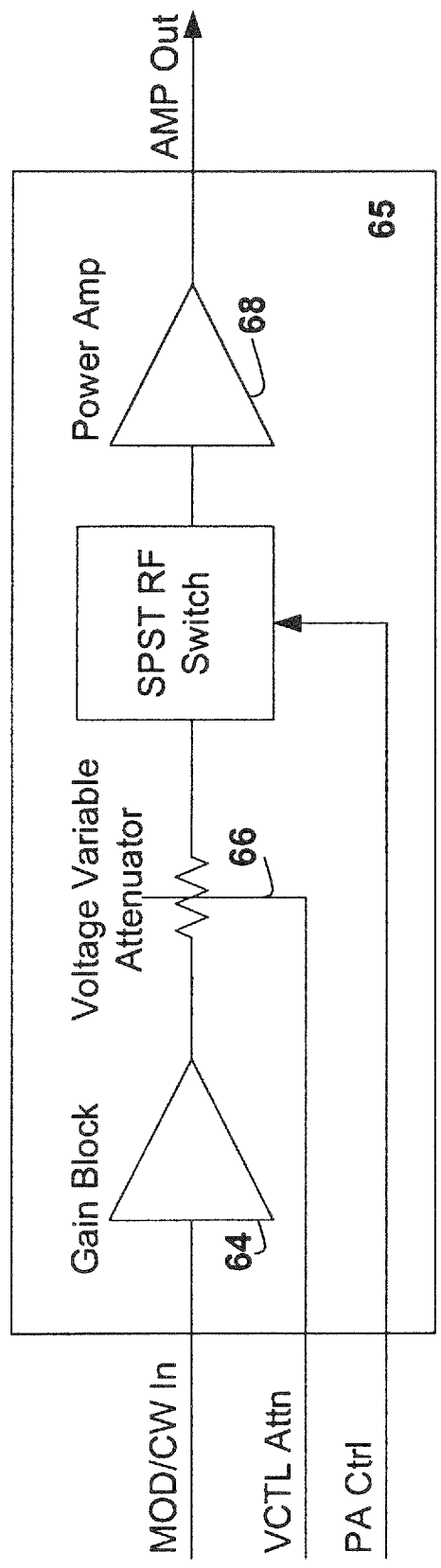
Figure 8 Power Amplifier Block Diagram

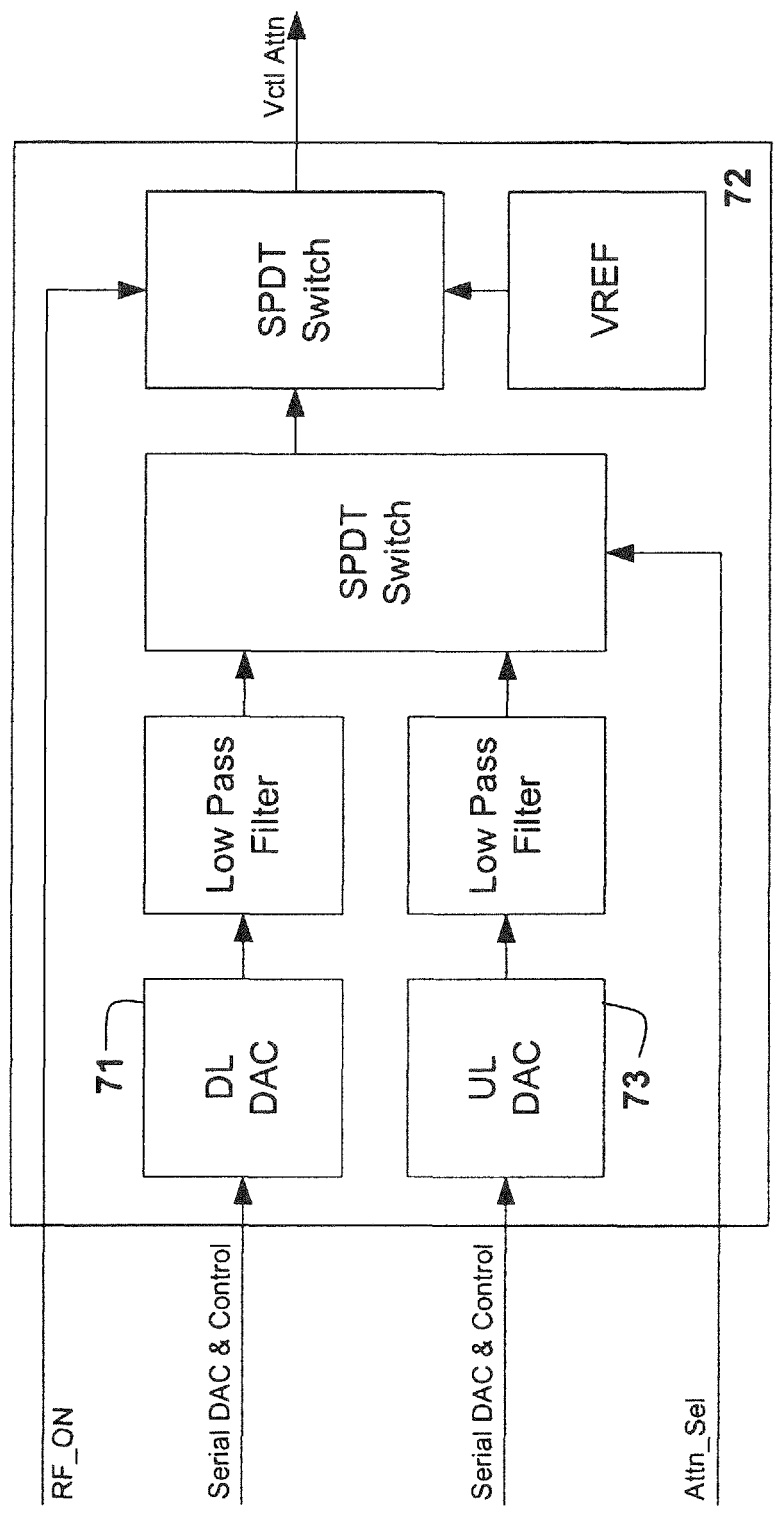
Figure 9 Downlink / Uplink DACs and Power Control Block Diagram

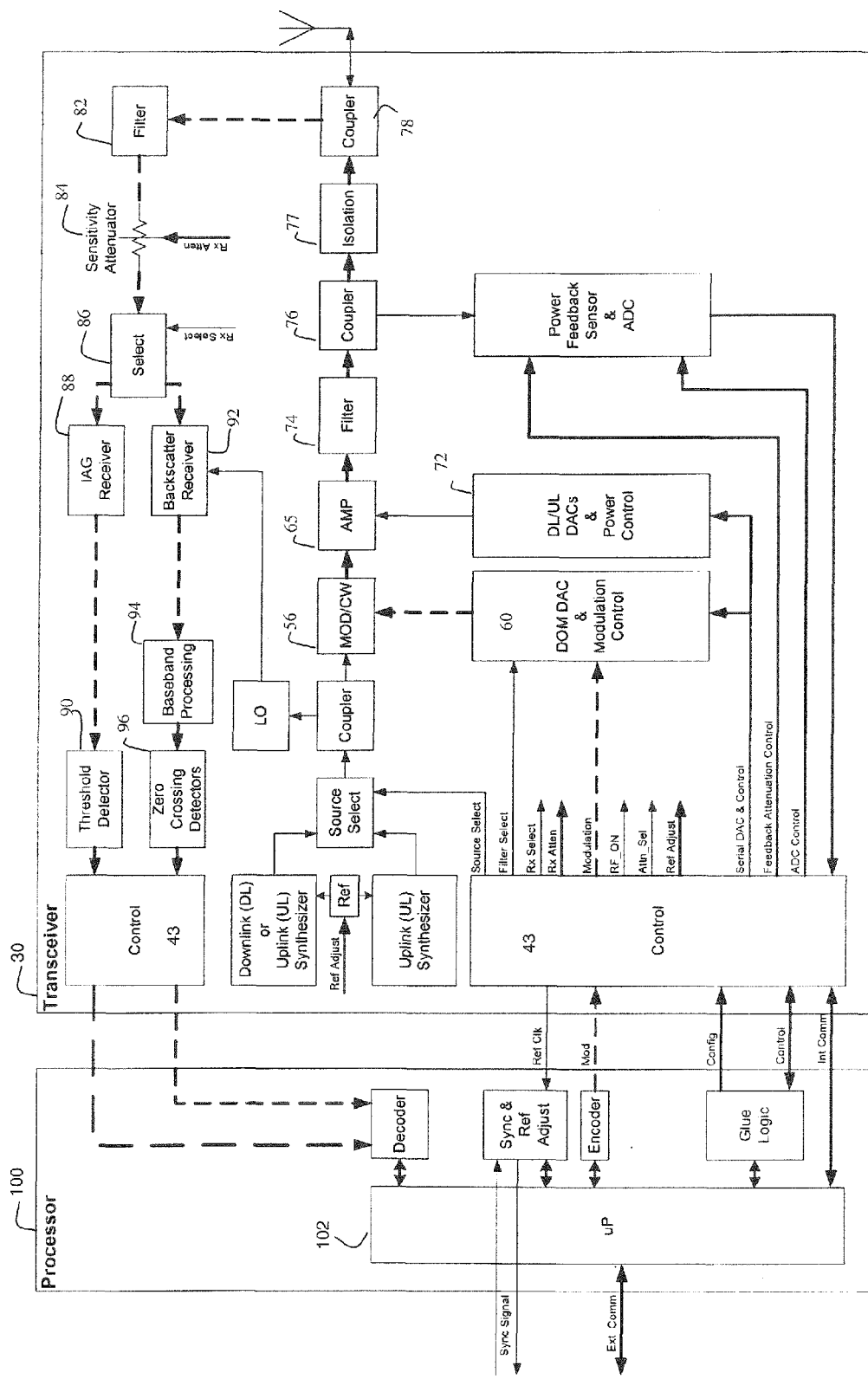
Figure 10 Built-In-Test Loop-Back Path

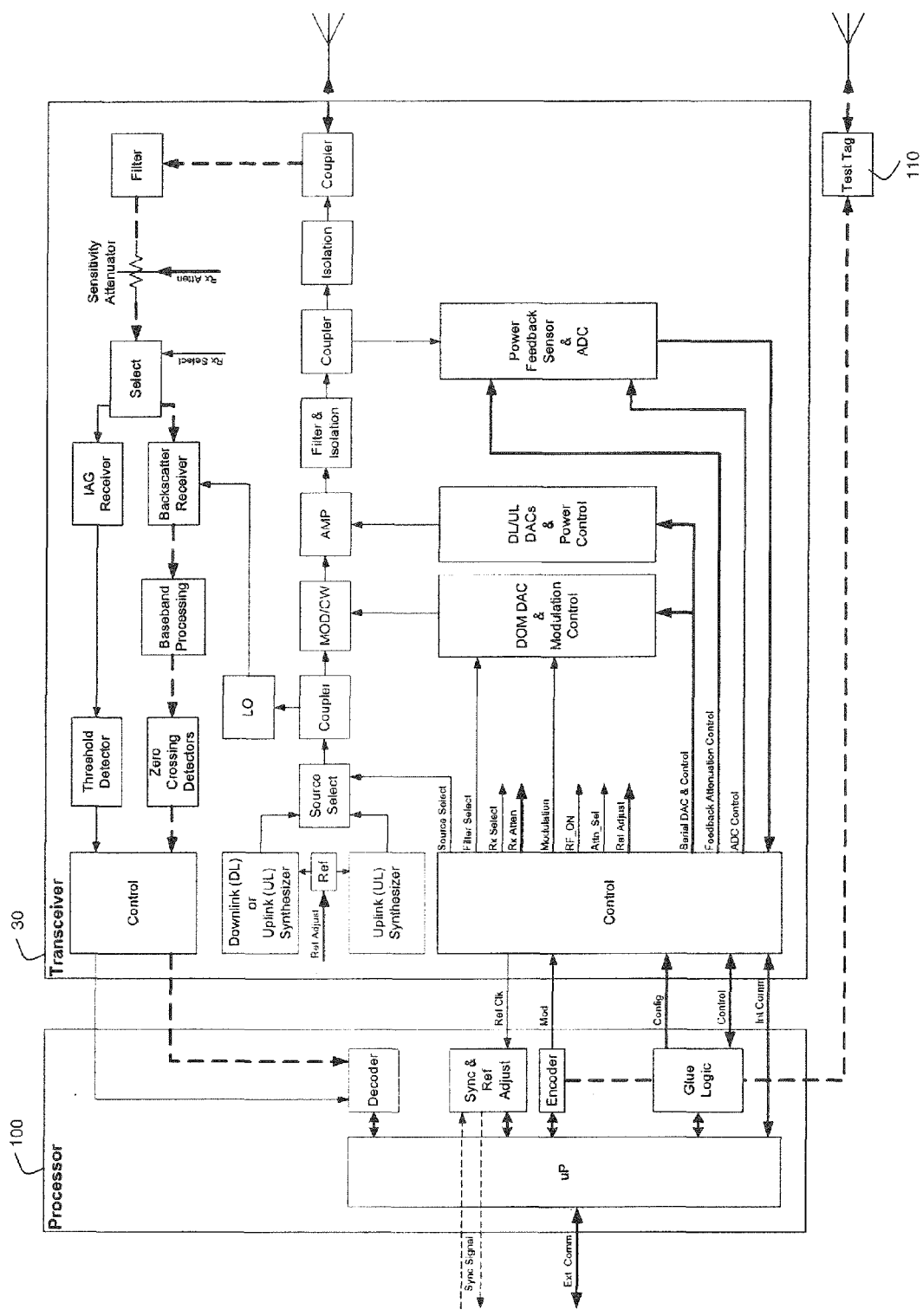
Figure 11 Built-In-Test with Test Tag and Coupling Antenna

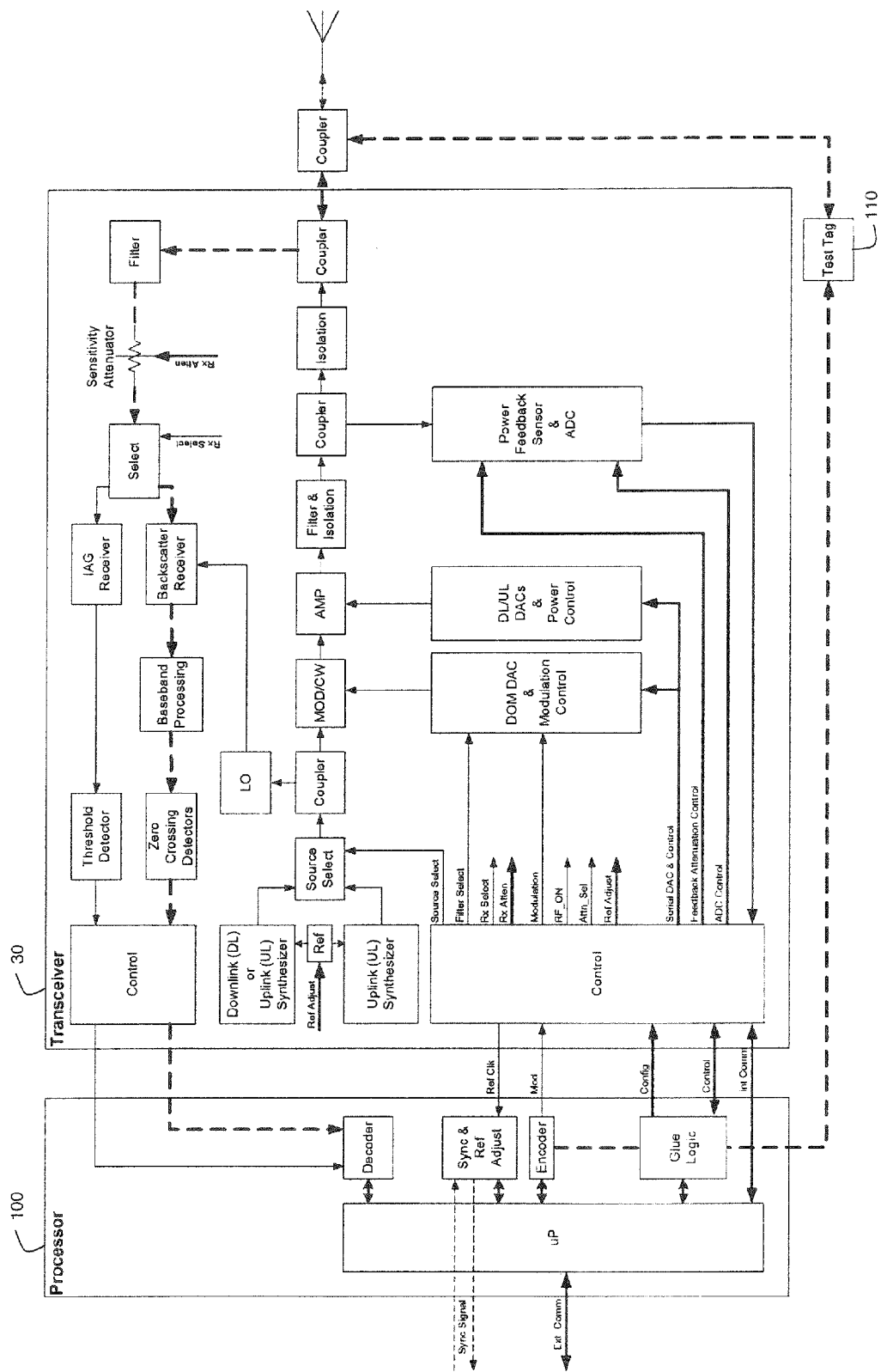
Figure 12 Built-In-Test with Test Tag and Directional Coupler

MULTI-PROTOCOL RFID SYSTEM

CROSS-REFERENCE TO RELATED APPLICATIONS

This application is a continuation of U.S. patent application Ser. No. 14/623,278 filed on Feb. 16, 2015, and which is a continuation of U.S. patent application Ser. No. 11/764,005, filed Jun. 15, 2007 now U.S. Pat. No. 9,135,480, which is a division of U.S. patent application Ser. No. 10/887,320 filed Jul. 9, 2004. The latter application subsequently issued as U.S. Pat. No. 7,548,153 on Jun. 16, 2009.

BACKGROUND OF THE INVENTION

1. Field of the Invention

The present invention relates to interrogatory systems. More particularly, the present invention relates to an interrogatory system having closely-spaced interrogators that simultaneously process different tag protocols or commands.

2. Background of the Related Art

As discussed in U.S. Pat. No. 5,030,807 to Landt, RFID (radio frequency identification) systems use frequency separation and time domain multiplexing in combination to allow multiple interrogators to operate closely together within the bandwidth limitations imposed by radio regulatory authorities. In transportation and other applications, there is a compelling need for interrogators to operate in close proximity. In the example of a toll collection system, many lanes of traffic are operated side by side, and it becomes necessary to simultaneously read tags that are present in each lane. This introduces new challenges, particularly when a system is designed to communicate with tags of differing protocols, requiring performance sacrifices.

Backscatter RFID systems, because they are frequency agile, can use frequency separation to allow simultaneous operation of closely-spaced interrogators. However, the ability to operate with acceptable performance is limited by the ability of the interrogator to reject adjacent channel interference, and in the case where frequencies are re-used, co-channel interference. In addition, the interference impact of operating multiple interrogators in close proximity to one another is complicated by second and third order inter-modulation effects. Because the downlinks (interrogator to tag) are modulated signals and the uplink signals (tag to interrogator) are continuous wave (CW) carriers at the interrogator, the interference on an uplink by a downlink is more severe in most cases than either downlink on downlink interference or uplink on uplink interference. When downlink on uplink interference debilitates performance beyond an acceptable level, the system could be set up for time division multiplexing among the interrogators. Interrogators would then share air time (take turns) according to a logic scheme to minimize or eliminate the impact of the interference between interrogators. That, however, results in lower speed performance since a given transaction requires more total time to complete. When a large number of lanes are involved, the speed performance loss can be severe and unacceptable.

Active RFID systems typically cannot use frequency separation due to the fact that cost-effective active transmitters operate on a fixed frequency. These systems have therefore followed an approach of operating in a pure time division mode to prevent interference among closely located interrogators.

Downlink on downlink interference typically occurs when a tag receives the signals from two interrogators. If the interrogators are closely spaced, the RF level of the two transmitted bit streams may be comparable. If significant RF from the adjacent interrogator is received during bit period when none should be received, the tag may incorrectly decode the message.

From a self-test perspective, RFID systems typically utilize what is commonly known as a "check tag" to provide a level of confidence regarding the health of the RFID system. The check tag can be an externally powered device that responds only to a specific command or responds only to its programmed identification number. It can be built into the system antenna or it can be mounted on or near the system antenna. It can also be housed within the interrogator and coupled to the system antenna via a check tag antenna mounted near the system antenna. Though the check tag can take a variety of forms, one commonality is that the check tag must be activated in some manner so that the response can be read by the interrogator and remain inactive during normal operation.

When a check tag is activated, it typically provides a response that can be read by the interrogating device. The check tag response is generally the same as what would be received by the interrogator during normal operation as a tag passes through the system in that particular application. If a backscatter RFID system initiates a check tag and a response is received, it verifies the RFID system is operational to the point that RF has been transmitted and the check tag backscatter response received and decoded. Encoded modulation of the RF is only verified if the check tag requires a modulated signal to trigger its response. The time that it takes to complete the cycle depends upon the type of tag utilized and can range from a few to several milliseconds, and the cycle is repeated periodically.

SUMMARY OF THE INVENTION

It is therefore one object of the present invention to provide an interrogating system that is able to simultaneously operate a plurality of closely-spaced interrogators. It is another object of the invention to provide an interrogating system that synchronizes a plurality of interrogators. It is another object of the invention to provide a system that simultaneously processes different protocols used to communicate with tags. It is another object of the invention to provide a system that simultaneously processes different backscatter protocols. It is yet another object of the invention to provide a system that simultaneously processes different active and backscatter protocols. It is yet another object of the invention to provide an interrogating system that avoids interference on an uplink by a downlink, as well as downlink on downlink interference, and uplink on uplink interference. It is yet another object of the invention to provide a self-test operation that can verify operation of the interrogator and that does not have the time constraints of the check tag. It is another object of the invention to provide an interrogation system in which uplink signals are received, and downlink signals are sent, over a single antenna.

In accordance with these and other objects of the invention, a multi-protocol RFID interrogating system is provided that employs a synchronization technique (step-lock) for a backscatter RFID system that allows simultaneous operation of closely spaced interrogators. The interrogator can read both active and backscatter tags more efficiently when combined with time division multiplexing. The multi-protocol RFID interrogating system can communicate with backscatter transponders having different output protocols and with active transponders, including: Title 21 compliant RFID backscatter transponders; IT2000 RFID backscatter transponders that provide an extended mode capability beyond Title 21; EGO™ RFID backscatter transponders, SEGO™ RFID backscatter transponders; ATA, ISO, ANSI AAR compliant RFID backscatter transponders; and IAG compliant active technology transponders.

The system implements a step-lock operation, whereby adjacent interrogators are synchronized to ensure that all downlinks operate within the same time frame and all uplinks operate within the same time frame. The step-lock operation allows for improved performance with higher capacity of the RFID system. Active and backscatter technologies are implemented so that a single interrogator can read tags of both technology types with minimal interference and resulting good performance.

The step-lock operation eliminates downlink on uplink interference. Because downlink on uplink interference is the most severe form of interrogator-to-interrogator interference, that has the net impact of reducing the re-use distance of a given frequency channel significantly. The step-lock technique can be extended to reduce or eliminate downlink on downlink interference for fixed (repeating) downlink messages. This can be achieved by having the interrogators transmit each bit in the downlink message at precisely the same time. Depending on radio regulations and the number of resulting available frequency channels with a given backscatter system, that can allow re-use distances sufficiently close that an unlimited number of toll lanes can be operated without any need to time share among interrogators, drastically improving performance and increasing capacity of the overall RFID system.

Step-locking of the interrogators allows the interrogators to operate in a multi-protocol mode, whereby the same interrogator can read both active and backscatter tags in a more efficient way. This is accomplished by combining a time division strategy for active transponders and the step-locked frequency separation strategy for backscatter tags into one unified protocol.

BRIEF DESCRIPTION OF THE FIGURES

FIG. 1 is a block diagram of interrogators in a step-lock configuration where the synchronization signal is generated by the interrogator in a Master/Slave mode;

FIG. 2 is a block diagram of interrogators in a step-lock configuration where the synchronization signal is generated by an external source;

FIG. 3(a) is a timing diagram of the step-lock feature showing the uplinks, downlinks, and processing times for multiple interrogators;

FIG. 3(b) is a timing diagram at the bit level;

FIG. 3(c) is a timing diagram of the step-lock feature having a time division multiplex;

FIG. 4 is a preferred block diagram of the interrogator;

FIG. 5 is a block diagram of the synthesized sources 33, 45 of FIG. 4;

FIG. 6 is a block diagram of the dual mixer configuration 56 of FIG. 4;

FIG. 7 is a block diagram of the DOM DAC and modulation control 60 of FIG. 4;

FIG. 8 is a block diagram of the power amplifier 65 and its peripherals of FIG. 4;

FIG. 9 is a block diagram of the downlink/uplink DACs and power control 72 of FIG. 4;

FIG. 10 is a block diagram of the interrogator showing the loop-back built-in-test capability;

FIG. 11 is a block diagram of the interrogator showing the test tag built-in-test capability with a coupling antenna;

FIG. 12 is a block diagram of the interrogator showing the test tag built-in-test capability with a directional coupler;

DETAILED DESCRIPTION OF THE PREFERRED EMBODIMENT

Figure 13:
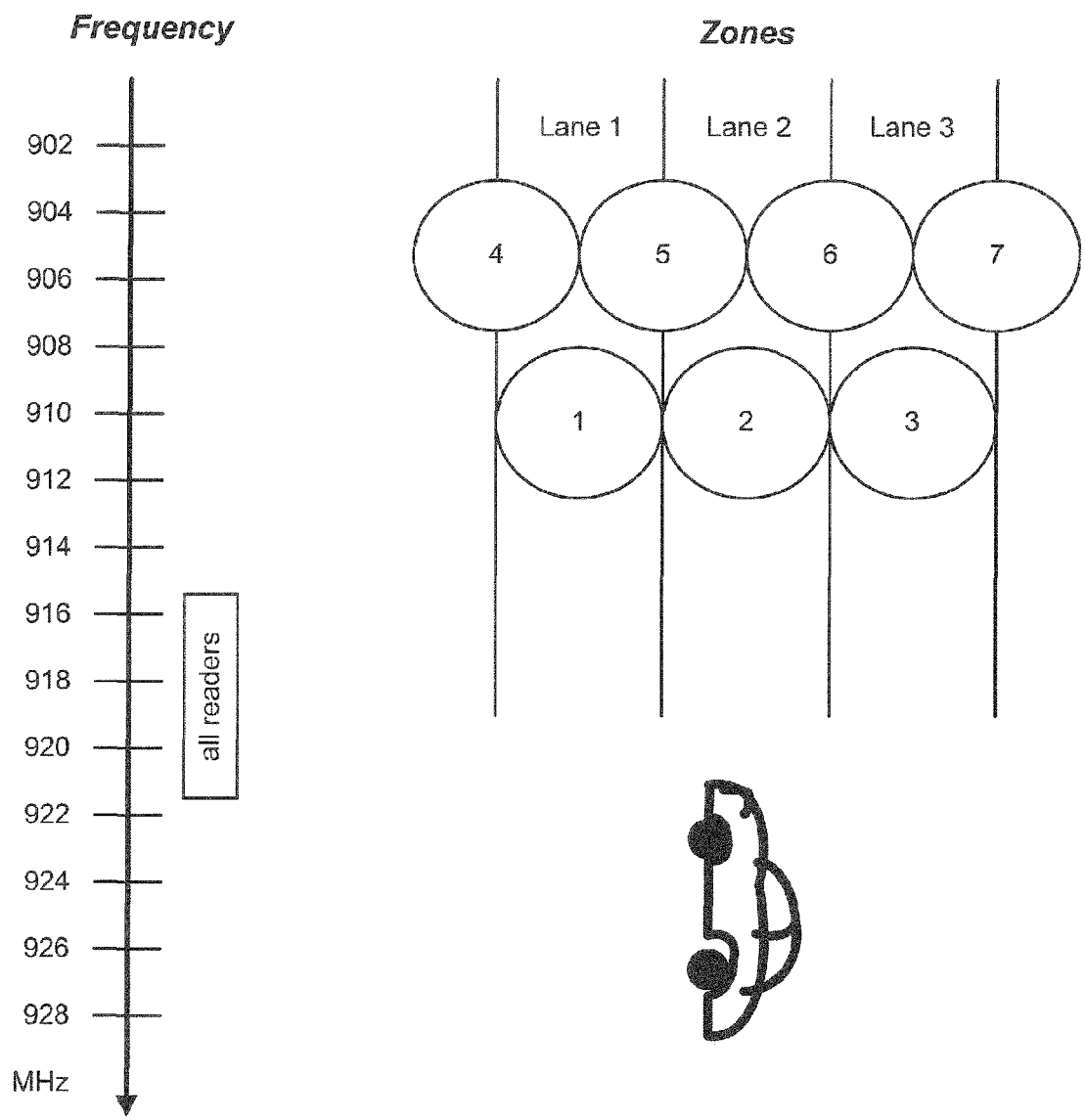
FIG. 13 is a lane plan for the system showing the downlink frequencies for a single protocol having different command sequences.

In the following detailed description of the preferred embodiment, reference is made to the accompanying drawings that form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

Turning to the drawings, FIG. 1 is a block diagram of the overall system 10 in accordance with a preferred embodiment of the invention. The system 10 depicts a single cluster of interrogators 12 and hosts or controllers 14 in a step-lock configuration, and various active or backscatter transponders 11. As shown, the interrogators 12 communicate with the transponders 11 in accordance with various tag protocols, Tag Protocol 1 and Tag Protocol 2. The controller 14 controls and interfaces various system components, such as the associated interrogator 12, vehicle detection, and video enforcement, as may be required by the specific application.

One interrogator 12 is designated as the master, while the rest of the interrogators 12 are designated as slaves. The master interrogator 12 generates a synchronization signal 16 and transmits it to the slave interrogators 12. The interrogators 12 are connected together via an RS-485 interface for multipoint communication in half-duplex operation, and the synchronization signal 16 is transmitted over that line. The overriding factors in master/slave designation are the timing parameters set in the respective interrogators 12 versus the reception of the synchronizing signal 16. The timing parameters are set in each interrogator 12, such that the subsequent slave can become the master in the event of a failure.

The interrogator 12 preferably has a single antenna 18 that is used to transmit the modulated downlink signal to interrogate a transponder 11. The single antenna 18 also transmits the CW uplink signal required to receive the backscatter response of a backscatter transponder. In addition, the single antenna 18 receives the response from an active transponder 11.

FIG. 2 is a block diagram of the system 20, showing interrogator clusters 22 and associated hosts or controllers 24 in a step-lock configuration. An external source 26 is provided that generates the synchronization signal 28. In the preferred embodiment, the external source 26 is a GPS receiver that has a 1 pps (pulse per second) signal that is utilized to enable synchronization of the respective clusters 22. The master interrogator locks a reference clock to the GPS 1 pps signal, and uses the reference clock to generate the synchronization signal that is sent to the slave interrogators. The timing of the 1 pps signal from a GPS unit is very precise, which allows each of the clusters to be synchronized together in time. This configuration is utilized when distance, or some other physical impediment, does not allow for a direct connection of the clusters 22. Generally, one GPS receiver is required per cluster 22, and the interrogators 22 can then be connected as shown in FIG. 1 to synchronize the cluster to the external source.

FIG. 3(a) is a timing diagram showing several interrogators 10 operating in step-lock. The diagram shows that all of the interrogators 12 transmit their uplink and downlink signals at the same time. When interrogators 10 are step-locked, the timing for each interrogator 10 is controlled so that the uplinks and downlinks all start and end at the same time. That reduces interference caused by one interrogator's downlink signal interfering with another interrogator's uplink signal. By utilizing different frequency plans among the various tag protocols, the number of interrogators in a particular cluster can be increased.

As shown in FIGS. 1-2, the system polls a Title 21 backscatter transponder for specific information, and then polls an EGO backscatter transponder for specific information and the respective transponders respond accordingly. Each interrogator 12 transmits a Tag Protocol 1 signal and Tag Protocol 2 signal to each of the transponders 11. The Title 21 backscatter tags 11 provide a backscatter response to the corresponding Title 21 protocol signal, Tag Protocol 1, and the EGO backscatter tags 11 provide a backscatter response to the corresponding EGO protocol signal, Tag Protocol 2.

FIG. 3(a) shows the timing required to support two tag protocols. As depicted, the first tag protocol, Tag Protocol 1, has downlink and uplink periods that differ from the downlink and uplink durations of the second tag protocol, Tag Protocol 2. The tag protocols may also have different processing times that follow the uplink of data. Thus, if the tag protocols are left unsynchronized, there is the strong potential that the downlink for either the first or second protocol of one interrogator would interfere with the uplink for either the first or second protocol of another interrogator. To avoid that interference, the interrogators are step-locked so that the downlinks of the first tag protocol end at the same time for all of the interrogators, and the downlinks of the second tag protocol also end at the same time for all of the interrogators, as shown in the figure. The timing is controlled by a synch signal at the beginning of each cycle, which triggers the downlink signal of Tag Protocol 1.

If only those two types of tags are being interrogated, then the signal pattern in FIG. 3(a) would repeat itself. If more tag protocols are used, then the uplink and downlink signals for the additional tags are transmitted before the pattern is repeated. In some cases, a particular tag protocol may be transmitted multiple times before the interrogators switch to a different protocol, such as if the tag needs to be read multiple times or if the tag is read and then put to sleep by an additional command.

Thus, the protocols are preferably implemented in a serial fashion, whereby each interrogator cycles through the various protocols before repeating the pattern and all the interrogators are processing the same protocol. That is, the downlink and uplink signals for Tag Protocol 1 are processed by all of the interrogators at the same time, followed by a processing time and the downlink and uplink signals for Tag Protocol 2. It should be apparent to one skilled in the art that the protocols need not be aligned in a serial fashion, but can be run simultaneously in a parallel fashion by synchronizing the downlink times across the different protocols. That is, a first interrogator can process a first protocol downlink signal while a second interrogator processes a second protocol downlink signal. This type of step-lock is illustrated with respect to commands of a single protocol, for instance, in FIG. 18, which is discussed below.

Figure 18:
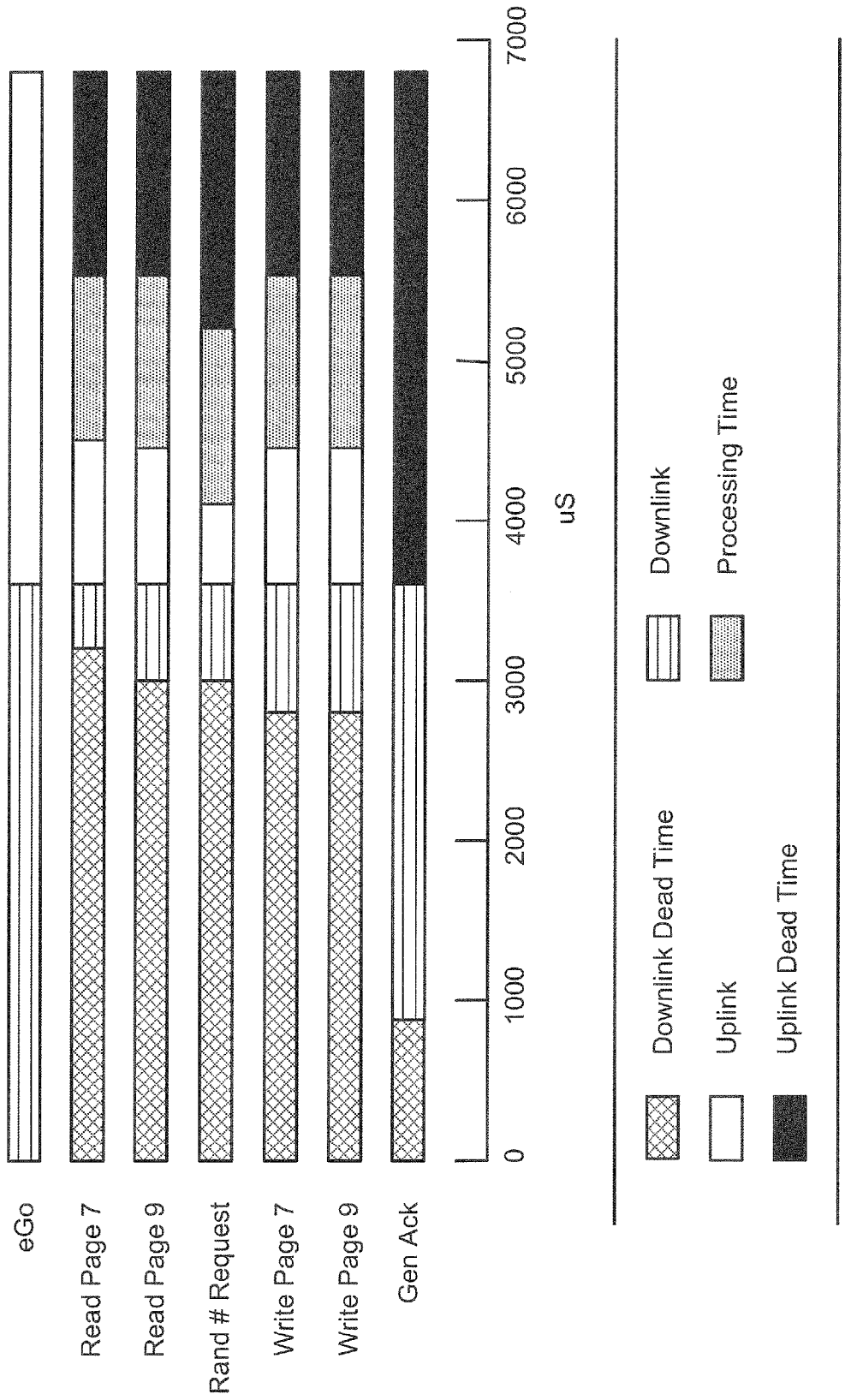
FIG. 18 is a timing chart for the system of FIGS. 16 and 17, showing the protocol sequences.

However, having the interrogators process the same protocols minimizes any delay between the various signals due to the different signaling durations of the various protocols. For instance, if Interrogator 1 processes Tag Protocol 1 and Interrogator 2 processes Tag Protocol 2, a delay would have to be introduced before the downlink of Tag Protocol 1 since the downlink of Tag Protocol 2 is much longer, so that Tag Protocol 1 is not uplinking while Tag Protocol 2 is still downlinking. As shown in FIG. 18, the time for each transmission is increased to allow for the longest command, which is the select or read command of the EGO protocol.

FIG. 3(b) is a diagram showing the step-lock technique extended to the bit synchronization level for the signals of FIG. 3(a). Each interrogator is step-locked and the transmission of each bit in the downlink message is transmitted at precisely the same time. For bit synchronization, the exact same command (bit for bit) has to be transmitted by each interrogator and is intended for protocols that satisfy that criteria.

FIG. 3(c) shows the timing using a time division multiplexing and step-lock synchronization for an application that includes both active and backscatter transponders. The synch signal initiates the signal cycle, which in this case starts with the first set of interrogators, Interrogators 1, 4, 7, generating a transmit pulse in accordance with Tag Protocol 1, the active tag protocol.

The active protocol is sent in accordance with a time division multiplex scheme. The transmit pulses are offset to prevent interference that corrupts data received by the reader which might otherwise result from closely located tags. Accordingly, the active protocol is divided into three time slots. In the first slot, the first interrogator and every third interrogator transmit the downlink for the active tag protocol. Following the transmission of the downlink, every interrogator looks for a response from the tag. If an interrogator that transmitted the downlink receives a response, that interrogator assumes that the tag is under its antenna. If an interrogator that did not transmit the downlink receives a response, that interrogator assumes that the tag is under the antenna of a different interrogator. The interrogator will preferably ignore responses of tags that under the antenna of a different interrogator.

In the second and third time slots, the other interrogators transmit in their respective slots, and each interrogator uses the same logic on the received signals to decide if a tag response is under their antenna. Following the completion of the active tag protocol, every interrogator transmits the backscatter protocol downlink, and then looks for the backscatter uplink signal from the tag.

Interrogators

The multiple protocols supported by the interrogator translate to the specific requirements of the respective transponders. The tags can be passive or active, battery or beam powered, with additional variables that are dictated by the physics of the transponder. Thus, the interrogators 12 must be able to accommodate the different variables and requirements for active and passive tags, as well as the different commands and backscatter protocols. In addition, the interrogators 12 must be capable of adjusting itself to handle different protocol power levels, depths of modulation, duty cycle, speed (bit rates), frequency of transmissions, receiver range adjustments, as well as tag and interrogator sensitivity.

Since the interrogator controls the power of the signal reflected by a backscatter transponder, the uplink RF power level is utilized to set the respective uplink capture zone for a backscatter transponder. The downlink RF power level is used to communicate with a transponder that requires a modulated command (Title 21, IT2000, EGO, SEGO backscatter transponders), or a trigger pulse (active transponder), before the device will respond. Thus, the RF downlink power is utilized to establish a downlink capture zone for the transponders specified, and in the case of backscatter transponders, can be different than the uplink RF power level. In addition, the RF power level required by a beam powered transponder is much greater than that required by a battery powered transponder. Closed loop control is implemented to maintain tight control of the dynamic RF power level that is required by the system.

The requirement to support multiple depth of modulation (DOM) levels is necessary due to the fact that the transponder receiver dynamic range is dependent upon the DOM transmitted during the downlink. The base band path of the respective transponders can be AC or DC coupled where the DC coupled path typically requires a larger modulation depth. Closed loop control is implemented to maintain control of the dynamic DOM level from protocol to protocol.

The ability to adjust duty cycle provides the flexibility to compensate for finite non-linearity in the interrogator modulation path and the capability to optimize the duty cycle to the respective transponder requirements. The duty cycle would typically be set at 50% with a small tolerance; however, the ideal for a transponder type could be higher or lower. The adjustment of the duty cycle or pulse width aids in the tuning of the modulated signal to the transponder requirements and in the derivation of transponder sensitivity to variations of duty cycle.

With the exception of the Title 21 and IT2000 protocols, the baud rates are different for all the protocols. The ratio from the fastest protocol to the slowest protocol is in excess of 10-to-1. The interrogator must accommodate the different baud rates from the point of origin within the interrogator through transmission while maintaining control of RF power, DOM and the emission mask. The frequency of transmission, and when to actually transmit, relates to the synchronization period and must be variable in order to accommodate all combinations of protocols and command sequences.

Finite receiver adjustments provide the capability to vary the sensitivity level of the interrogator for each protocol. Ideally, the default would be to have the interrogator sensitivity level of each protocol approximately the same. In a multi-mode application that requires the sensitivity levels of respective protocols to be different, they can be adjusted accordingly. An example is a multiple protocol application with a beam powered transponder of one protocol and a battery powered transponder of another protocol. The capture zone of the battery powered transponder can be adjusted to a certain degree by the level of RF transmitted. The same is true for the beam powered transponder, but to a much lesser degree. If it is desired to align the capture zones, the receiver adjustment provides another degree of freedom. This adjustment is provided for the RF receive path and in the form of threshold levels in the base band receivers that must be exceeded for the signal to pass. This technique is also useful for the elimination of undesirable cross lane reads.

FIG. 4 is a preferred block diagram of the interrogator 12. The interrogator 12 has a transceiver 30, and a processor 100. The transceiver 30 provides the communications link to the transponder, and the processor 100 provides the functional control of the interrogator 10. The transceiver 30 is comprised of a transmitter chain that generates the amplitude modulation ("AM") and CW carriers, a receiver to accept and process either the backscatter or active response of the respective transponder, and a controller to interface to the processor and provide the necessary control for the transmit and receive functions.

The transceiver 30 includes a transmitter chain and a receiver chain. The transmitter chain includes sources 33, 45, source select 44, MOD/CW 56, RF AMP 65, filter 74, coupler 76, isolation 77 and coupler 78. The receiver chain includes filter 82, attenuator 84, select 86, receivers 88, 92, baseband processor 94, and detectors 90, 96.

Transmitter

The transmitter chain begins with the generation of two synthesized RF sources, the downlink/uplink source 45 and the dedicated uplink source 33. The sources 33, 45 are used to generate the uplink and downlink signals, such as the ones shown in FIG. 3(a). A downlink/uplink source 45 generates the first synthesized RF signal (S1), which is used as a downlink modulated source to interrogate, activate, and/or trigger a transponder. This source can also be used as an uplink continuous wave (CW) source to provide the communications link for the response of a backscatter tag. The uplink source 33 generates a synthesized RF source (S2), which is used as an uplink CW source to provide the communications link for the response of a backscatter tag. The sources 33, 45 are synthesized low phase noise sources that aid in providing high backscatter receiver performance with a single antenna.

Turning to FIG. 5, the sources 33, 45 include a frequency synthesizer 34, loop filter 36, low phase noise voltage controlled oscillator (VCO) 38, and a coupler 40. The coupler 40 has a gain block 39 to feedback the VCO 38 output back to the synthesizer 34 to comprise a low phase noise phase lock loop (PLL). The output of the PLL has a high isolation buffer amplifier to provide gain and isolate the PLL from the transmitter chain. The processor 100 initializes the S1 and S2 sources to fixed frequencies through the controlling device 43 on the transceiver 30 via the Clock, Data and Load signals. An adjustable oscillator (not shown) provides the reference signal for both the uplink synthesizer 33 and the downlink/uplink synthesizer 45. The oscillator is adjustable to provide the capability to calibrate to an external standard reference.

Source selection circuitry 44, comprised of high isolation single-pole, single-throw (SPST) switches, is used for sources 33, 45 that feed into a high isolation single-pole, double-throw (SPDT) non-reflective switch. That provides the ability to select either source 33 or 45, while maintaining a high degree of isolation between the sources 33, 45 to minimize the generation of inter-modulation products. The processor 100 controls the state of the switches through the controlling device 43 on the transceiver 30.

A local oscillator (LO) 48 for the direct conversion backscatter receiver is coupled off of the output of the SPDT switch 45. It is fed into a high isolation buffer amplifier (not shown) to provide gain and isolate the transmitter chain from the receiver-portion of the transceiver 30. The LO level is fixed by a gain block, low-pass filtered and fed into a high isolation SPST switch (not shown) to provide additional isolation from the active receiver. The processor 100 controls the state of the SPDT switch of the source 45 through the controlling device 43 on the transceiver 30.

The MOD/CW block 56 provides the capability to modulate the respective source or place the source in a CW condition. As shown in FIG. 6, the MOD/CW block 56 is comprised of a dual mixer configuration separated by a gain block. That configuration provides a high dynamic range of linear AM modulation to aid in reducing the transmitted occupied bandwidth. Though this type of configuration can introduce non-linear second-order effects, utilizing the second mixer to provide the majority of the AM modulation minimizes the distortion. The mixers 56 are driven at base band with the respective protocols bit stream, trigger signal or DC level, respectively, by amplifiers that provide the required drive levels. The drive levels from the amplifiers produce the desired peak level for CW or the "high" and "low" condition when modulating.

Transmitter Bit Rate and DOM Adjustment

The difference between the respective data rates of the protocols requires a configuration that can support the data rates for all of the protocols, while maintaining an emission mask that minimizes channel spacing in order to maximize the number of available channels. Bit rate adjustment is handled in the interrogator, FIG. 4, by the modulation control block 60, which is shown in greater detail in FIG. 7. The DOM DAC & Modulation Control 60 utilizes a switch to select between the high-speed path and the low-speed path. The high-speed path accommodates the high-speed protocols, such as Title 21 and IT2000, and a low-speed path accommodates the low-speed protocols, such as EGO, SEGO and a trigger pulse. The controlling device 43 on the transceiver 30 selects the desired path based on the protocol configuration indicated by the processor 100. Eighth-order low-pass filters provide the desired emission mask for the supported protocols.

The control unit 60 receives a fixed DC reference level (VREF), which sets the level that indicates the transmission of a "high" bit, or CW condition as required, and is the same for all protocols. A digital-to-analog converter (DAC) 70 sets the level that indicates the transmission of a "low" bit, or the DOM (depth of modulation) level, which is retrieved from a memory in the controller 43 as required. The Modulation signal provides true logic control of an SPDT switch that selects either the "high" condition or the "low" condition based on the state of the Modulation signal.

Each protocol that requires a modulated downlink transmission from the interrogator has a corresponding memory location in the controlling device 43 on the transceiver 30 that is calibrated to the DOM level required for that protocol. Switching between the respective DOM levels is handled by the controlling device 43 based on the protocol configuration indicated by the processor 100. The modulation control unit 60 outputs a Filter Mod signal, which is used by the MOD/CW 56 to modulate the signal in accordance with the desired protocol.

Transmitter Power Level Adjustment

The interrogator must also be able to accommodate the various power levels required by the various backscatter protocols and the active transponder protocol. Power adjustment is handled in the interrogator, FIG. 4, by the RF AMP 65 and the power controller 72, which are shown in greater detail in FIGS. 8 and 9. Turning to FIG. 8, the RF AMP 65 is comprised of a gain block 64, voltage variable attenuator 66, RF switch, and a 900 MHz Integrated power amplifier 68. The gain block 64 provides the desired level into the voltage variable attenuator 66. The voltage variable attenuator 66 is utilized to vary the RF power based upon a VCTL Attn signal received from the power controller 72. The attenuator 66 provides a fixed rise time when turning on RF power for CW transmission and also to the DOM level prior to a modulated transmission.

The DL/UL DACs & Power Control 72 is shown in FIG. 9. A downlink DAC 71 sets the RF peak power level required for a downlink transmission to a transponder. An uplink DAC 73 sets the RF power level required for an uplink transmission of CW for a response from a backscatter transponder. Selection between the low-pass filtered uplink and downlink levels is handled by the Attn_Sel signal through an SPDT switch. Another SPDT switch passes the selected DAC level or a preset reference level as the VCTL Attn signal, which is utilized to limit the dynamic range of the voltage variable attenuator 66. Both the downlink and uplink power levels are calibrated independently to provide 15 dB of dynamic range in 1 dB steps.

Each protocol requiring a downlink transmission from the interrogator has an independent memory location in the controlling device 43 to store the static power level for the respective configuration. The same is true for each protocol that requires an uplink transmission. The controller 43 controls the sequence of the downlink and uplink transmissions based on the protocol configuration and discrete inputs from the processor 100. The integrated power amplifier 68 is selected to provide the maximum desired output at the RF port while maintaining a high degree of linearity. The RF switch is utilized to provide the necessary OFF isolation when the active receiver is enabled.

Transmitter Signal Processing

A low-pass filter 74, coupler-isolator-coupler configuration 76, 77, 78 completes the transmitter chain. The low-pass filter 74 attenuates harmonic emissions. The first RF coupler 76 provides the feedback necessary for closed-loop control. The coupled signal from the coupler 76 is fed into a 4-bit digital step attenuator 97 that provides 15 dB of dynamic range in 1 dB steps. By providing the dynamic range in the power control feedback path, the closed loop control of downlink and uplink RF output power is simplified and accuracy of the transmitted power level is improved.

The 15 dB feedback attenuation range coincides with the 15 dB dynamic range of the transmitter to set the respective power level for the downlink or uplink transmission. The feedback attenuator is set such that the attenuation level set on the uplink or downlink transmission, plus the level set on the digital step attenuator 97 in the feedback loop, always add up to 15 dB. That minimizes the dynamic range of the signal after the digital step attenuator 97 to the highest DOM level required by the supported protocols. The attenuator 97 output is fed into a logarithmic RF power detector 98 that converts the RF signal into a voltage equivalent that corresponds to the RF level detected.

In essence, the modulating signal is reconstructed at voltage levels that represent the peak value transmitted for a digital "high" on the downlink, a digital "low" representing the DOM level, or the CW level on the uplink. The voltage levels for a digital "high" and a CW condition remain virtually the same for the entire 15 dB dynamic range for transmit power due to the corresponding level set on the digital attenuator in the feedback loop. The voltage level for a digital low corresponds to the respective DOM level set for the protocol being transmitted.

In normal operation, the signal representing the detected RF level is adjusted for temperature drifts seen by the detector circuit and scaled for input into an analog-to-digital converter (ADC) 99. The output of the ADC 99 is fed into the controlling device 43 on the transceiver 30 that provides control of peak power, CW power, and the DOM, by utilizing closed loop algorithms. The isolator 77 provides isolation of the transmitter from the Tx port and the antenna port. The final RF coupler 78 provides the receive path from the antenna port to the Rx port.

Receiver

The receiver portion of the transceiver 30, FIG. 4, accepts and processes the backscatter and active responses of the respective transponders. The RF receive chain begins with a band pass filter 82 that includes a pre-attenuator and a post-attenuator followed by a gain block. The filter 82 establishes the pass band for the backscatter receiver and encompasses the pre-selector for the active receiver as well. The sensitivity attenuator 84 and gain block establishes the RF dynamic range of the receiver.

The sensitivity attenuator 84 is also adjustable based on the protocol selected, to provide the capability to independently adjust and tune the sensitivities of the respective protocols. The sensitivity attenuator 84 is a 4-bit digital step attenuator that provides 15 dB of dynamic range in 1 dB steps. This attenuator provides the capability to vary the sensitivity level of the interrogator for each protocol. From a calibration standpoint, the sensitivity level of each protocol would be set such that they are approximately the same provided they meet established limits. For instance, if the maximum sensitivity of one protocol is −66 dBm and the maximum sensitivity of another protocol is −63 dBm, both can be calibrated to −62 dBm assuming the limit is −60 dBm. Adjusting for the active and backscatter receive sensitivities aids in the alignment of the capture zone when operating in a multiple protocol environment.

The select block 86 provides the capability to select between two different receive paths, a backscatter receive path (along elements 92, 94, 96) and an active receive path (along elements 88, 90), based on the protocol selected. An RF switch is utilized to separate the backscatter receive path and the active receive path. The processor 100 controls the state of the switch through the controlling device 43 on the transceiver 30.

The backscatter receive path includes the backscatter receiver 92, baseband processing 94, and zero crossing detectors 96. The backscatter receiver 92 includes a 0 degree power divider, a 90 degree hybrid, isolators, and mixers. The 0 degree power divider allows for an I & Q (In-phase & Quadrature) configuration that has two signals, one that is in-phase and one that is 90 degrees out of phase. To produce the I & Q channels, the LO 48 output is fed through the 90 degree hybrid. The receive and LO paths are then fed through isolators in their respective paths to provide the RF and LO inputs to mixers for direct conversion to base band for processing by the baseband processing 94. The isolators in the 0 degree path are required to isolate the active receiver from the transmitter LO and provide a good voltage standing wave ratio (VSWR) to the hybrid coupler, which results in good phase and amplitude balance.

The isolators in the 90-degree path are also required to provide a good VSWR to the hybrid coupler. In the baseband processing 94, filter and amplifier paths are provided for high, medium, and low speed I & Q signals to allow for the differing bandwidth requirements of the respective protocols. Zero-crossing detectors 96 convert the signals into a form required by the controlling device on the transceiver for additional processing.

The active receive path includes an active receiver 88 and a threshold detector 90. The active receiver 88 includes a band pass filter, gain block and attenuation, logarithmic amplifier. The band pass filter establishes the pass band and noise bandwidth for the active receiver. The gain block and attenuation combination establishes the dynamic range of the receiver in conjunction with a logarithmic amplifier that converts a received Amplitude Shift Keyed (ASK) transmission to base band. The base band processing, which is part of the active receiver 88, does a peak detect and generates an automatic threshold to provide greater receiver dynamic range and signal level discrimination. A static adjustable range adjust threshold sets the initial threshold level for the threshold detector 90. The threshold level is selected so that the receiver is not affected by noise by setting the initial threshold level for the threshold detector 90 above the receiver's noise floor level. The threshold level also aids in the alignment of the capture zone. In a given application, the capture zone can be reduced from its maximum by increasing this threshold level.

Dynamic Adjustments

The controlling device 43 on the transceiver 30 provides the necessary functionality and control for factory calibration, initialization, source selection, DOM (closed-loop), RF power (closed-loop), transmitting and receiving, and built-in-test. The preferred embodiment of the controlling device 43 is a Field Programmable Gate Array and the associated support circuitry required to provide the functionality described. The capability to factory calibrate is provided for the synthesizer reference clock, depth of modulation, and RF power. Calibration of the reference clock is provided through a digitally controlled solid-state potentiometer that feeds into the voltage controlled frequency adjust port of the reference oscillator. The oscillator is factory calibrated to a frequency standard that provides the LO for the measuring device. The digitally controlled potentiometer contains on-board non-volatile memory to store the calibrated setting.

Depth of modulation calibration is provided for the levels required by the supported protocols. The levels are 20 dB (IT2000), 30 dB (Title 21) and 35 dB (EGO, SEGO, IAG), which are stored in non-volatile memory during factory calibration. The respective levels are retrieved from the controller's 43 memory and loaded into the DOM DAC 70 based upon the protocol that is selected and what the DOM level was set to for the respective protocol during the initialization of the transceiver 30.

RF power is calibrated in 1 dB steps over the 15 dB dynamic range for both synthesized sources 33, 45. Each level is stored in non-volatile memory during factory calibration. The respective levels are retrieved from memory and loaded into the downlink and uplink attenuation DACs 72 based upon the protocol that is selected and what the power level was set to for the respective protocol during the initialization of the transceiver 30.

The initialization process sets the frequency for the synthesized sources S1, S2, as well as for the downlink attenuation, uplink attenuation, source designation, duty cycle, base band range adjust and sensitivity adjust levels for the respective protocols. A clock, serial data line, and a load signal are provided by the processor 100 to load the synthesizers 33, 45.

A serial UART is used to pass attenuation, source designation, range and sensitivity adjust from the processor 100 to the transceiver 30.

Source selection and transmit control is provided by the processor 100 via configuration discretes that designate the selected protocol in conjunction with a discrete that indicates whether downlink or uplink is active and a discrete for on/off control. Based upon the active configuration and the parameters set during initialization, the appropriate attenuation levels are set from the calibrated values in memory for the designated source. Acknowledge discretes are provided by the transceiver 30 to facilitate sequencing. The sequence is dictated by the respective protocol and is designed to maximize efficiency. In addition, an acknowledge message can be sent to the tag to activate audio/visual responses as well as put the transponder to sleep for a period of time defined in the acknowledgement message. It is desirable to put a tag to sleep so that it doesn't continue to respond, such as if the vehicle is stuck in a lane, and so that the interrogator can communicate with other tags.

The RF power control for the downlink and uplink RF output power is a closed loop system to provide stable power across frequency and temperature, and stable DOM, independent of protocol. In accordance with the preferred embodiment, the closed loop for DOM control includes the controller 43 (which includes the controlling algorithm), DOM controller 60, MOD/CW 56, RF AMP 65, filter 74, coupler 76, attenuator 97, sensor 98, ADC 99, and back to controller 43. The detected coupled output after the power amplifier provides the feedback path to the Field Programmable Gate Array 43. The Field Programmable Gate Array 43 contains closed loop algorithms for controlling both the CW uplink power levels and the peak power levels for the modulated downlink. The closed loop power control algorithm samples the peak power level in the feedback path and compares it to a factory calibrated power level reference. The control voltage (VCTL Attn) is adjusted through the DL/UL DAC & Power Control 72 to zero out the error from the comparison.

The DOM control is also a closed loop system to provide stable DOM across frequency and temperature, including for the RF AM DOM. Here, the closed loop for the peak RF power control includes the controller 43 (which includes the controlling algorithm), power controller 72, RF AMP 65, filter 74, coupler 76, attenuator 97, sensor 98, ADC 99, and back to the controller 43. The controller 43 includes a detected coupled output after a power amplifier that provides the feedback path to the Field Programmable Gate Array 43. The Field Programmable Gate Array 43 contains closed loop algorithms for controlling the DOM for the modulated downlink. The closed loop DOM control algorithm samples the minimum power level in the feedback path and compares it to a factory calibrated DOM reference for the respective protocol. The level within the Filter Mod signal that indicates the transmission of a "low" bit, or the DOM (depth of modulation) level, will be adjusted through the DOM DAC & Modulation Control 60 to zero out the error from the comparison.

Receive control is provided by the processor 100 via configuration discretes that designate the selected protocol. The microprocessor 102 generates the discretes, which in the preferred embodiment are five signals having a total of 32 unique modes. For instance, a discrete signal could be 00011, which signifies an EGO protocol and its specific parameters for operation. The discretes are sent to the controller 43, and the interrogator 12 configures itself to communicate with the selected tag by setting the appropriate power level, bit rates, backscatter path, and the like. Based upon the active configuration and the parameters set during initialization, the appropriate receiver is activated and the sensitivity adjust level is set from the calibrated values in memory for the respective protocol.

The processor 100 contains all of the necessary circuitry to perform or control the various interrogator functions. It contains a microprocessor 102 for running application code which controls manipulating and passing the decoded tag data to the host, communications interfacing, interrupt handling, synchronization, I/O sensing, I/O control and transceiver control. The self test techniques (discussed below) for the system utilizing the loop-back technique and the test tag technique are also controlled by the processor 100 through the configuration control discretes.

Dynamic RF Power Adjustment

The ability to adjust the level of RF power transmitted serves multiple purposes. Independent of transponder type and external interfering signals, capture zones rely upon the RF power transmitted and the gain of the transmit/receive antenna. The multiple protocols supported by the interrogator translates to the specific requirements of the respective transponders. They can be passive or active, battery or beam powered, with additional variables that are dictated by the physics of the transponder. These variables include transponder receive sensitivity, turn on threshold, antenna cross section and conversion loss. To support these variables, the RF power of the interrogator must be adjustable to levels stored in memory for each protocol such that the appropriate levels are set when the respective protocol is selected.

Dynamic Depth of Modulation (DOM) Adjustment

The ability to select the DOM level of the transmitted downlink serves major purposes. Independent of transponder type and external interfering signals, the transponders receiver dynamic range relies upon the DOM transmitted during the downlink. The multiple protocols supported by the interrogator translate to the specific requirements of the respective transponders. Their base band processing can be AC or DC coupled, with additional variables that are dictated by the physics of the transponder. To support these variables, the downlink DOM from the interrogator must be selectable to levels stored in memory for each protocol such that the appropriate DOM is set when the respective protocol is selected.

Dynamic Modulation Duty Cycle Adjustment

The ability to select the duty cycle for the base band downlink modulation provides the flexibility to compensate for finite non-linearity in the modulation path and the capability to optimize the duty cycle to the respective transponder requirements.

A synchronous clock provides the capability to lengthen a "high" bit on the modulated signal from the encoder to increase the duty cycle of the signal provided to the DOM DAC & Modulation Control 60. Conversely, lengthening a "low" bit on the modulated signal from the encoder decreases the duty cycle of the signal provided to the DOM DAC & Modulation Control 60. To support this capability, the duty cycle value is retrieved from the memory of the controller 43 that was set during the initialization process for each protocol such that the appropriate duty cycle is set when the respective protocol is selected.

The independent adjustment of the duty cycle or pulse width aids in the tuning of the modulated signal to the transponder requirements and in the derivation of transponder sensitivity to variations of duty cycle. For example, the Title 21 specification does not specify duty cycle or the rise and fall times for the reader to transponder communication protocol. Consequently, manufacturers who build transponders that meet the Title 21 specification produce transponders with characteristics that differ with respect to these parameters.

Dynamic Frequency Selection

Frequency selection is dynamic in the sense that there are separate downlink and uplink sources 33, 45 that are fixed to specific frequencies. In a typical single mode application with multiple interrogators, the downlink (or modulated) frequency is set to the same frequency on all of the interrogators and the uplink (or CW) frequency is set to specific frequencies that are dependent on the respective protocol. Higher data rate protocols require more separation between uplink frequencies but allow for frequency reuse across multiple lanes, i.e., use the same frequency in multiple lanes, without interference. Lower data rate protocols require less separation between uplink frequencies, however, frequency reuse becomes much more of an issue.

The interrogator 12 will typically operate on a single downlink frequency, so that only a single downlink synthesizer 45 is needed. However, the uplink signals can be sent on more than one frequency. Since each of the synthesizers 33, 45 operate at a fixed frequency, it would be time consuming to switch the internal frequency for that synthesizer. Accordingly, two synthesizers can be used to send uplink signals. The uplink synthesizer 33 can send an uplink signal on a first frequency, and the downlink/uplink synthesizer 45 can send an uplink signal on a second frequency. It should be recognized, however, that the invention can be implemented using more than one downlink frequency, and more or fewer uplink frequencies.

Thus, when a high speed protocol and a low speed protocol are integrated into a single multiple interrogator application, channel limitations arise due to bandwidth limitations imposed by radio regulatory authorities. The system allows for this by the use of the step-lock arrangement and the capability to setup the interrogator to allow the downlink source to be utilized as the uplink source for the low speed protocol while the high speed protocol utilizes the dedicated uplink source. This allows for the high speed and low speed protocols to be channelized independently within the regulatory bandwidth limitations and provides flexibility for the multiple protocol, multiple interrogator application.

Self-Test Operation

The check tag system of the prior art is not well suited for use with then multiple protocols of the present invention. The multiple check tags used to verify the respective signal paths place additional time constraints and inefficiencies on the system. Instead, turning to FIG. 10, the system includes a self-test operation having the additional capability of synchronizing the self-test cycle within a cluster of interrogators 22. Backscatter operation requires that the interrogator transmit uplink signals as a continuous wave (CW) in order to receive the response from a backscatter transponder. Since the receiver is active during the transmission of the uplink CW, it is possible for the backscatter receivers to detect and process the downlink signal, which is an amplitude modulated (AM) carrier.

The serial bit stream originating from the processor 100 via the encoder 104 is looped back to the processor 100 via the decoder 106 as indicated by the dotted lines. The loop starts at the encoder 104, and proceeds to the controller 43 to the DOM DAC & Modulation Control 60, to the MOD/CW 56, to the AMP 65, to the filter 74, to the coupler 76, to the isolation 77, to the coupler 78, to the filter 82, to the sensitivity attenuator 84, to the select 86. At the select 86, the Rx Select signal determines the path that the serial bit stream will take. One state will take it through the backscatter receiver 92 chain while the other state will take it through the active receiver 88 chain.

As a result of the loop, the processor 100 is able to verify whether the serial bit stream through the decoder 106 matches the bit stream sent via the encoder 104. If the serial bit stream sent by the encoder 104 matches the bit stream received by the decoder 106, the microprocessor 102 indicates that all of the elements along the test path are operating properly. However, even if the bit stream is off by a single digit, the microprocessor 102 will indicate that the system is not operating properly. Preferably, the test bit stream is between 4 and 16 bits in length, so that the test is fast, though a test could also have a bit stream length of an actual message, i.e., 256 bits.

Note that the active receiver 88 is tested as well with this process, if it is active during the transmission of the downlink AM carrier, even though that is not the normal mode of operation and only viable from a test standpoint. The serial bit stream can be a simple pattern and very short in duration compared to the response from even the highest baud rate check tag. This method provides the means to confidence test the downlink source, the RF transmitter chain, the active receiver and the backscatter receivers. The uplink source can be tested in the same manner by simply modulating what would normally be the CW source.

However, the loop shown in FIG. 10 does not provide a confidence test of any components after the Tx/Rx coupler 78, i.e., the antenna, or the RF cable. To do so, the system uses the system shown in FIG. 11. The test tag 110 is a switching device connected to a coupling antenna that is mounted near the system antenna. The switching device is controlled by the processor 100 to produce a backscatter response when coupled to the uplink CW transmitted from the system antenna. The serial bit stream for the test tag 110 can be the same simple pattern utilized for the loop-back mode of FIG. 10, or it can be unique.

The system of FIG. 11 provides the means to confidence test the uplink source, the RF transmitter chain, the backscatter receivers as well as the antenna and coaxial cable. A full response can be simulated for backscatter tags to facilitate more in-depth testing when it is warranted. A simplified alternative to this method is shown in FIG. 12, where the transmitter is coupled directly to the test tag 110. The self-test system can be used with any transmitter, receiver or transceiver, and need not be used with a step-locking system or an interrogator. In step-lock, the interrogator treats the test sequence as another protocol so that the test occurs in the same time frame. Thus, in the embodiment of FIG. 3(*a*) for instance, the test sequence would occur after the processing time of Tag Protocol 2 and prior to another Sync Signal.

Illustrations

FIGS. 13-21 illustrate various embodiments of the system. In each of these embodiments, the system is designed to cover an unlimited number of lanes, though preferably the system is used with up to about eleven lanes of traffic, plus four shoulder lanes. The system accommodates two primary protocols. The first protocol is for a tag sold under the trade name EGO. The first protocol has uplink frequencies that should not be shared since it could result in frequency instability. In addition, there must be at least 500 kHz clear spectrum around each uplink channel. The downlink channels can share the same frequency, or they can be on different frequencies. The downlink spectrum from modulation will interfere with uplink and must be kept out of the uplink receive bandwidth.

The second protocol is for an IT2000 tag. The second protocol has tags that wake up in three stages; RF power gets them to stage one, detection of a downlink signal gets them to stage two, and stage three is the tag response to a read request. Uplink frequencies can be shared, and multiple interrogators can use the same channel on the uplink. There must be at least +/−6 MHz of clear spectrum around each uplink channel. Downlink channels can share the same frequency, or they can be on different frequencies. Downlink spectrum from modulation (either the first or second protocols) will interfere with the uplink signal and must be kept out of uplink spectrum.

For the interrogators, the downlink and uplink frequencies cannot be changed during operation, but remain fixed at their configuration frequencies. All interrogators are step-locked to each other so that they are synchronous in time. The timing is controlled by the TDM signal and internal CAM files. Step-locking keeps the interrogators from interfering with each other, and eliminates the need for shutting interrogators down during different time slots.

Single Tag Protocol

Figure 14:
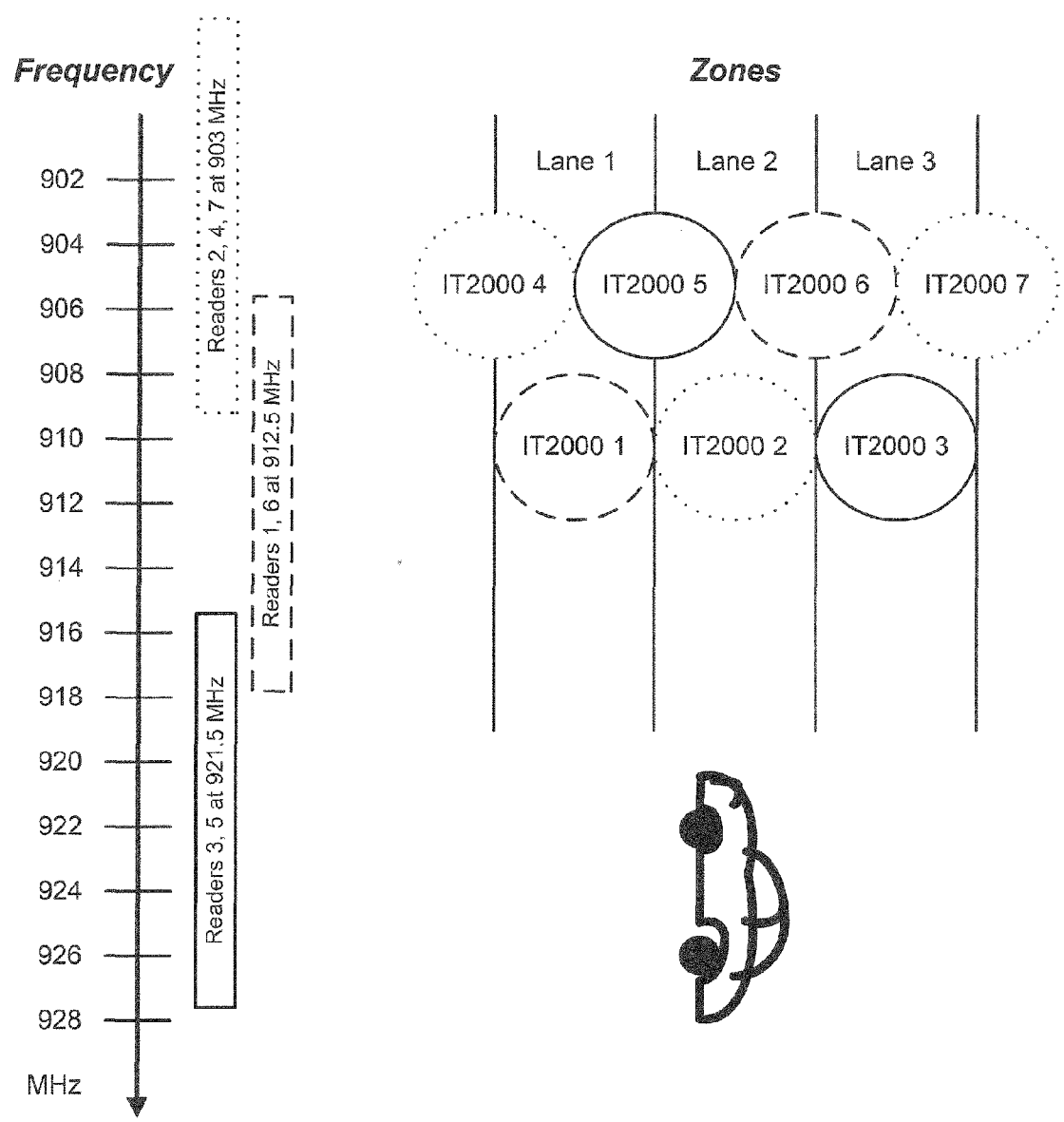
FIG. 14 is a lane plan for the system of FIG. 13, showing the uplink frequencies.
Figure 15:
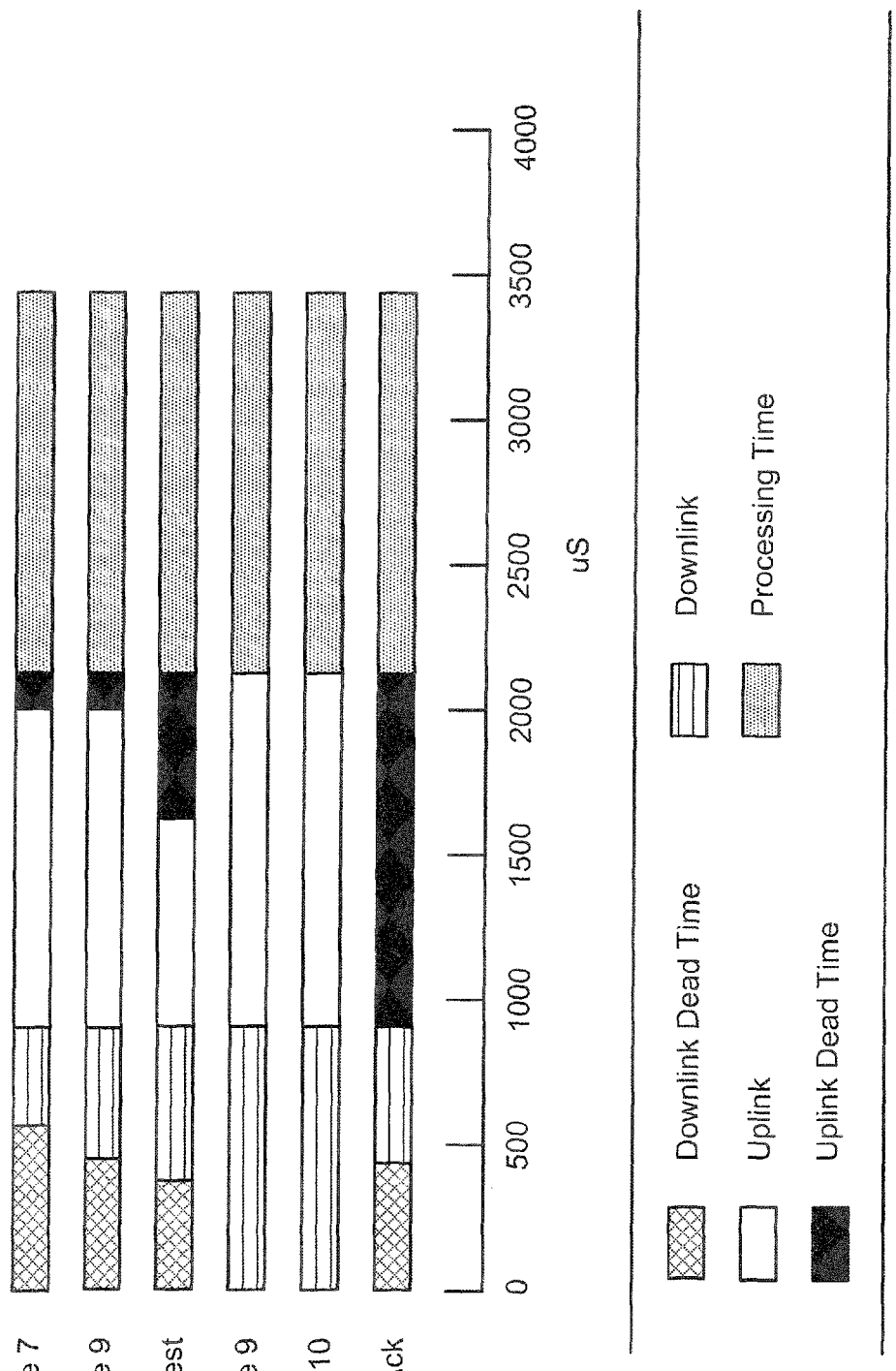
FIG. 15 is a timing chart for the system of FIGS. 13 and 14, showing the command sequences.

In the embodiment of FIGS. 13-18, a system is provided for tags employing a single signaling protocol, which is the IT2000 protocol in this illustration. As best shown in the embodiment of FIG. 15, there are several different commands of different lengths that have to be exchanged between the interrogator 12 and the tag. Since the commands are different lengths, the interrogator 12 adds dead time to the start of the shorter commands to ensure that all downlinks end at the same time.

This mode utilizes a frequency plan with the downlink at 918.75 and the uplinks at 903 MHz and 912.25 MHz and 921.5 MHz. The downlink and uplink are locked so that downlink signals do not interfere with uplink signals. However, the interrogators do not have to be command locked. They are able to independently issue commands. That means that one interrogator may issue a read request while an interrogator in another lane is issuing a write request. Only the uplink and downlink are synchronized. Since the downlinks happen at the same time, the uplinks do not occur at the same time as the downlinks, thereby freeing up the entire spectrum for each of the uplink and downlink transmissions.

The downlink frequency plan is shown in FIG. 13. In this configuration, all downlinks are operating on the same frequency. FIG. 14 show the uplink frequency plan, where the uplinks use a three frequency reuse plan, namely 921.5 MHz, 912.25 MHz, and 903 MHz. As shown, the ranges for each of the three different uplink frequencies do not overlap with one another, so that the frequencies are spaced across the lanes to reduce the interference between the interrogators. At the same time, each frequency is present in each of the three lanes, so that the interrogator for each lane can receive information on any of the uplink frequencies. The oval patterns are created by positioning an interrogator antenna 18 at the top of the oval.

In operation, upon power up or after a reset has occurred, the interrogator is initialized with the parameters required for the respective application, such as the downlink and uplink frequencies. Protocol specific parameters are also set during initialization, including downlink and uplink power level, DOM level, sensitivity attenuation, range adjust, as well as source, receiver and transmitter assignments for the specific application protocol. Those parameters correspond to the five bit configuration assigned in the processor 100 to the protocol.

Thus, for IT2000, a configuration of 00010 from the processor 100 signals the transceiver 30 to retrieve the IT2000 specific parameters from the controller 43 memory for an impending communication sequence. The transceiver acknowledges the processor 100, and indicates that it has received and set the appropriate parameters for the specific configuration. If it is a single protocol application, and the configuration does not change, occurs once since the transceiver 30 will then be set to the appropriate configuration from that time forward.

The processor 30 turns on the transceiver 30 transmitter chain and an IT2000 command is encoded and transmitted on the downlink source at a specific power and DOM level initialized for the IT2000 tags. The modulation signal travels through the high-speed transmit filter path set during initialization. Shortly after the downlink transmission is complete, the control signal changes state to turn the downlink source off. This also turns the uplink CW source on at a specific power level and enables the respective receive parameters that were set during initialization. If an IT2000 transponder response is received and decoded through the high-speed backscatter path, it is processed at the end of the uplink CW transmission and the sequence repeats. All timing is tightly controlled to accommodate the step-lock techniques. If step-lock is enabled, the sequences are keyed from the reception of the synchronization signal.

Turning to FIG. 15, the timing of the various uplinks and downlinks is shown. The timing gives an overall time per slot of at least about 3.5 ms, though the timing could be reduced to about just over 2 ms (the time it takes to complete the longest transaction, if no processing time was required. At 3.5 ms, the entire transaction takes a minimum of about 21 ms. In 3.5 ms a vehicle travels 0.51 feet (100 mph), and in 21 ms a vehicle travels 3.08 feet. Accordingly, the tag has the opportunity to cycle through the protocol several times prior to vehicle traveling a distance beyond the range required to uplink and downlink signals. For a 10 foot read zone, the tag could complete approximately 3.3 entire transactions.

As shown in FIG. 15, various downlink and uplink communication protocols are utilized by the interrogator. The commands are defined in the following Table 1. Thus, for instance, pursuant to the first command, Read Page 7, the interrogator sends a read request to the tag on the downlink, and the tag sends a read response on the uplink.

TABLE 1

| Protocol Commands | | |
|---|---|---|
| Command | Downlink | Uplink |
| Read Page 7 | Read Request | Read Response |
| Read Page 9 | Read Request with ID | Read Response |
| Random # Request | Random # Request | Random # Response |
| Write Page 9 | Write Request with ID | Write Response |
| Write Page 10 | Write Request with ID | Write Response |
| Gen Ack | General Acknowledgement | No Response |

In the example of FIG. 15, a different interrogator 12 transmits each of the commands. Accordingly, the duration of the uplink, downlink, uplink dead time, downlink dead time, and interrogator processing time differs for each of the various commands. For instance, the Write Page 9 and Write Page 10 commands have long downlink periods since information is being written. However, the signals are step-locked, so that all of the downlinks end at the same time and the uplinks start at the same time. Thus, there is no interference between the uplink and downlink transmissions.

Two Signaling Protocols

Figure 16:
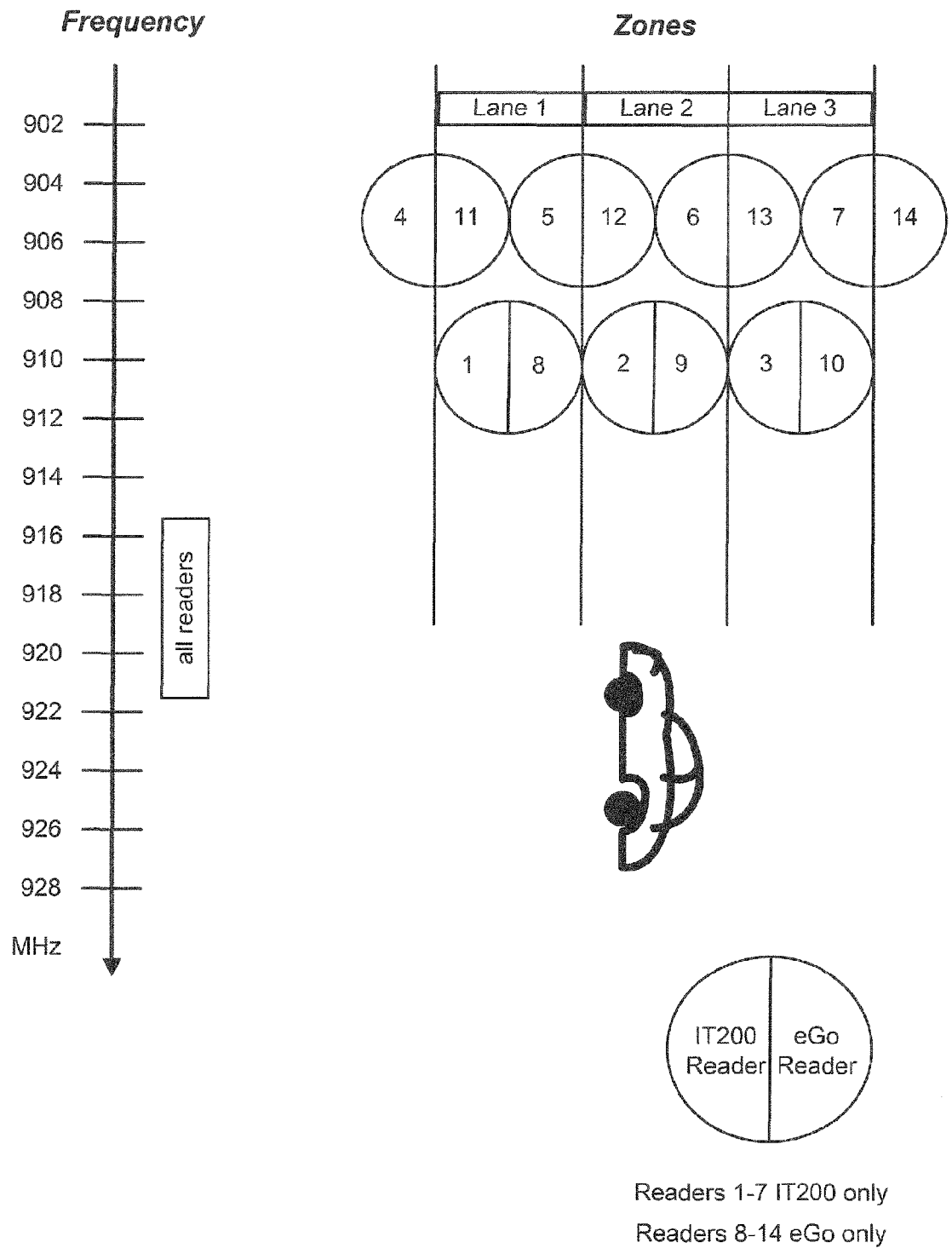
FIG. 16 is a lane plan for the system showing the downlink frequencies for active transponders and backscatter transponders.
Figure 17:
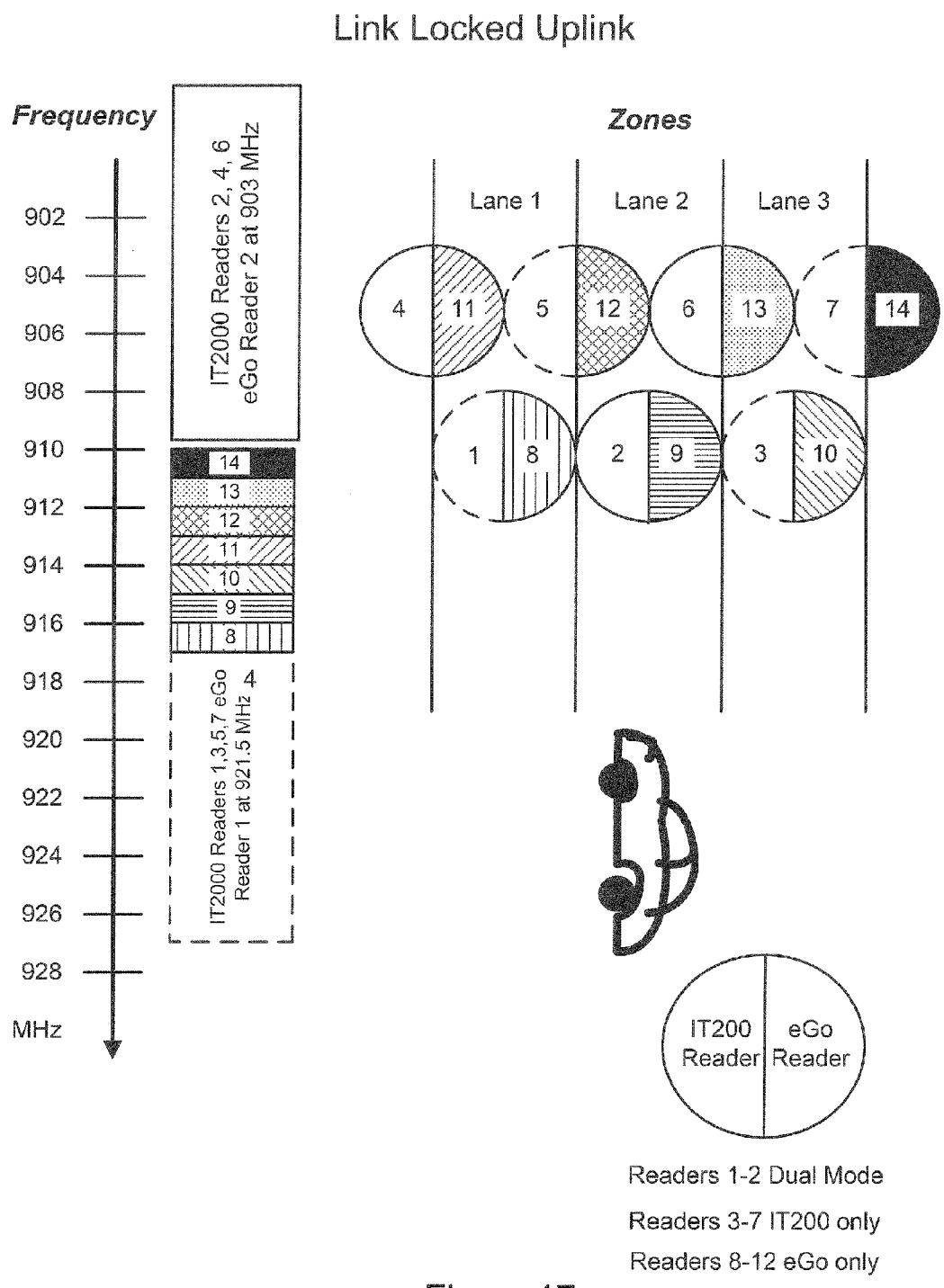
FIG. 17 is a lane plan for the system of FIG. 16, showing the uplink frequencies.

In the embodiment of FIGS. 16-18, a system is provided for tags employing two signaling protocols, which are the IT2000 and EGO protocols in this illustration. FIGS. 16-17 show the spectrum requirements for the frequency plan, with FIG. 16 showing the downlink plan and FIG. 17 showing the uplink plan. The plan requires that the downlink and uplink be synchronized for all interrogators. That means that during a certain time period all interrogators are transmitting their downlink signals. During the next time period the interrogators are transmitting their uplink signals. During these time periods the interrogators may be supporting either of the two protocols. It is not required for the interrogators to be synchronized for the protocols, only that the downlink or uplink signals be synchronized.

During the downlink cycle, all of the interrogators transmit at 918.75 MHz. During the uplink cycle, the odd IT2000 interrogators transmit at 921.5 MHz, and the even interrogators transmit at 903 MHz. The EGO uplinks are spaced between 910 MHz and 915.5 MHz. The interrogators have to be either IT2000 or EGO interrogators. The means that if lane coverage requires 7 coverage areas, this implementation would require 14 separate interrogators. Or if the interrogators are frequency agile, then the interrogator could switch between the required IT2000 uplink frequency and the required EGO uplink frequency depending on the protocol being transmitted at that time.

Adding additional interrogators can cover additional lanes. The number of EGO uplink channels that can be supported between 910 MHz and 915.5 MHz limits the number of lanes. If the spacing between interrogators can be reduced to 500 kHz, the number of EGO interrogators supported would be 12. If additional EGO interrogators are needed then all the IT2000 uplinks could be moved to 903 MHz and room for an additional 12 EGO interrogators would be available between 915.5 MHz and 921.5 MHz. This configuration would support 24 EGO interrogators.

In operation, upon power up or after a reset has occurred, the interrogator is initialized with the parameters required for the respective application, such as the downlink and uplink frequencies. Protocol specific parameters are also set during initialization, including downlink and uplink power level, DOM level, sensitivity attenuation, range adjust, as well as source, receiver and transmitter assignments for the specific application protocols. Those parameters correspond to the five bit configuration assigned to the respective protocol.

A configuration of 00010 from the processor 100 signals the transceiver 30 to retrieve the IT2000 parameters from memory for an impending communication sequence. The transceiver acknowledges the processor 100, indicating that it has received and set the appropriate parameters for the IT2000 protocol. The processor 30 then turns on the transceiver 30 transmitter chain and an IT2000 command is encoded and transmitted on the downlink source at a specific power and DOM level initialized for the IT2000 protocol. The modulation signal travels through the high-speed transmit filter path set during initialization.

Shortly after the downlink transmission is complete, the control signal changes states to turn the downlink source off. That also turns the uplink CW source on at a specific power level and enables the respective receive parameters that were initialized for the IT2000 protocol. If an IT2000 transponder response is received and decoded through the high-speed backscatter path, it is processed at the end of the uplink CW transmission.

A configuration of 00011 from the processor 100 then signals the transceiver 30 to retrieve the EGO parameters from memory for an impending communication sequence. The transceiver acknowledges the processor 100, thereby indicating it has received and set the appropriate parameters for the EGO protocol. The processor 30 turns on the transceiver 30 transmitter chain and an EGO command is encoded and transmitted on the downlink source at a specific power and DOM level initialized for the EGO protocol. The modulation signal travels through the low-speed transmit filter path set during initialization.

Shortly after the downlink transmission is complete, the control signal will change states to turn the downlink source off. That also turns the uplink CW source on at a specific power level and enables the respective receive parameters that were initialized for the EGO protocol. If an EGO transponder response is received and decoded through the low-speed backscatter path, it is processed at the end of the uplink CW transmission and the entire sequence will repeat. All timing is tightly controlled to accommodate the step-lock techniques. If step-lock is enabled, as in FIG. 3(*a*), the sequences are keyed from the reception of the synchronization signal. The IT2000 protocol is Tag Protocol 1 and the EGO protocol is Tag Protocol 2.

FIG. 16 shows how the downlink frequency is used to cover a system that has three lanes with coverage for the shoulders of each of the outside lanes, and FIG. 17 shows the layout for the uplink frequencies. In the figures, the circles represent the coverage achieved over an area of the road surface. The numbers in the circles represent the individual interrogators, with the number on the left for the IT2000 interrogator and the number on the right for the EGO interrogator. The numbers assigned to each half-circle represent the frequency being used by that particular interrogator and matches up with a frequency on the left. The IT2000 interrogators alternate between frequencies at 903 MHz and 921.5 MHz. The IT2000 protocol allows the frequencies to be shared without the interrogators significantly interfering with each other. The EGO interrogators use the frequencies between 909.75 MHz and 915.75 MHz. Since each EGO interrogator requires a unique frequency for its uplink, the EGO frequencies are not shared.

FIG. 18 displays the timing required for the commands used by EGO and IT2000 tags. The first line is the EGO read command, which is a group select for the downlink and a work data (tag ID) on the uplink. This is the only EGO command required for this illustration. Upon receiving this command, the EGO tag reports back its ID. The rest of the commands are the IT2000 commands listed in Table 1 above, which are completed in the sequence shown.

The critical timing location is the transition between the uplink and downlink. That transition needs to occur at nearly the same time for all of the interrogators. If an interrogator stays in a downlink mode for too long, it could interfere with the uplink signals. The dead time for both the uplink and downlink is the time that no commands are being sent or received by the interrogator. The interrogators generally use the dead time to align their downlink and uplink signals. The processing time is the time required by the interrogator to process commands received by the tag.

The interrogator alternates between an EGO Read command and an IT2000 Read Page 7 command until it receives a tag response. An EGO tag response is processed during the uplink time and then is followed by an IT2000 Read Page 7 Command. The rest of the IT2000 commands follow an IT2000 tag response to the Read Page 7 Command.

By setting up the system the present way, an interrogator at one lane that is processing an IT2000 tag does not force the rest of the interrogators in the other lanes to wait until that tag is finished. The rest of the interrogators can continue to alternate between the IT2000 and EGO reads. The system dramatically increases the time required to process an IT2000 command. The current IT2000 transaction takes around 14 ms plus some additional transaction time. The minimum amount of time required for this process would be about 40 ms. If the interrogator misses any commands and the missed commands have to be repeated, the time would increase by about 7 ms per repeated command. At 100 mph, a vehicle travels about 6 feet in 40 ms, which is a significant portion of the capture zone.

Figure 19:
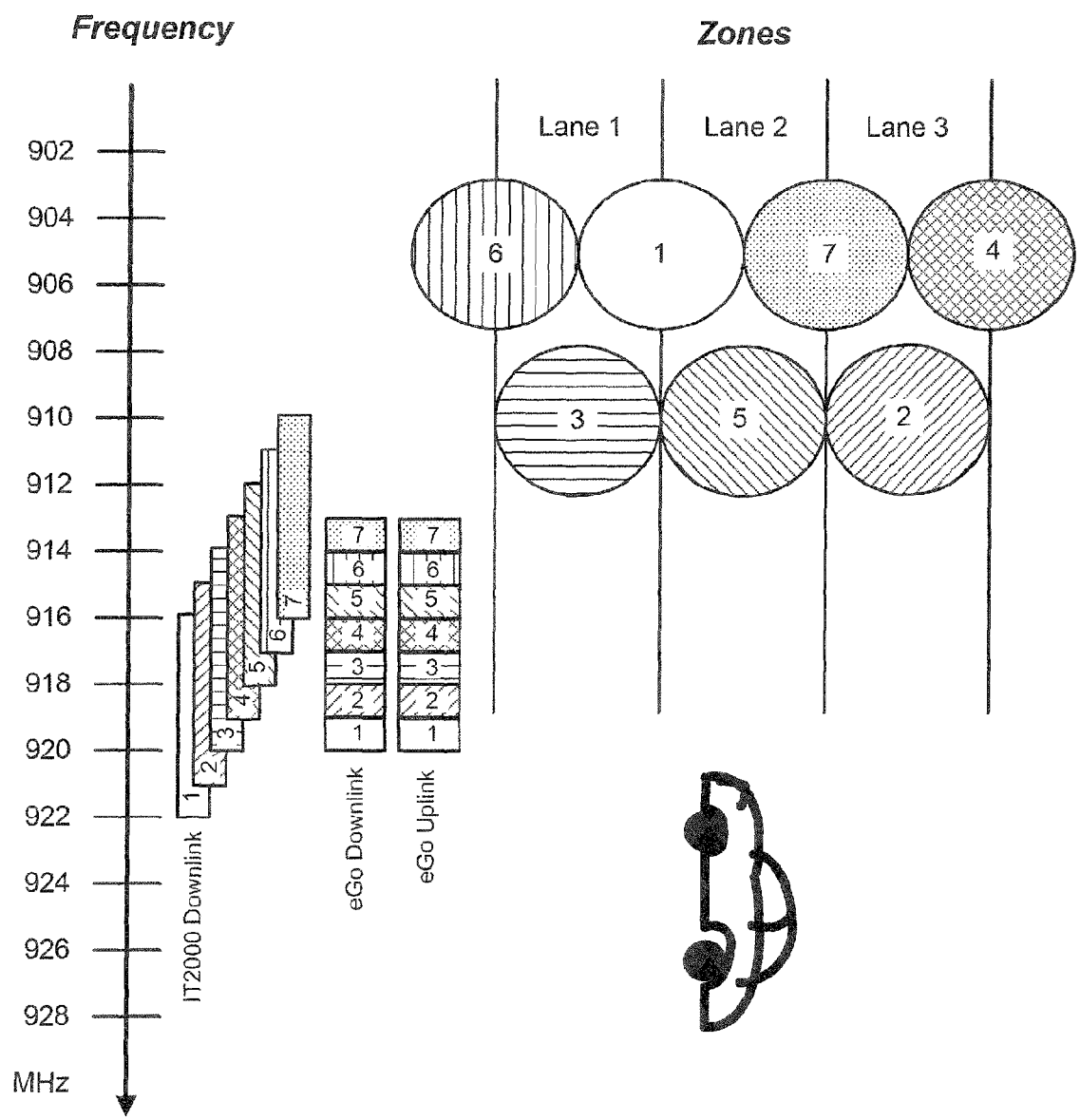
FIGS. 19 and 20 are lane plans for the system showing the downlink and uplink frequencies for active transponders and backscatter transponders; and, FIG. 21 is a timing chart for the system of FIGS. 19 and 20, showing the protocol sequences.
Figure 20:
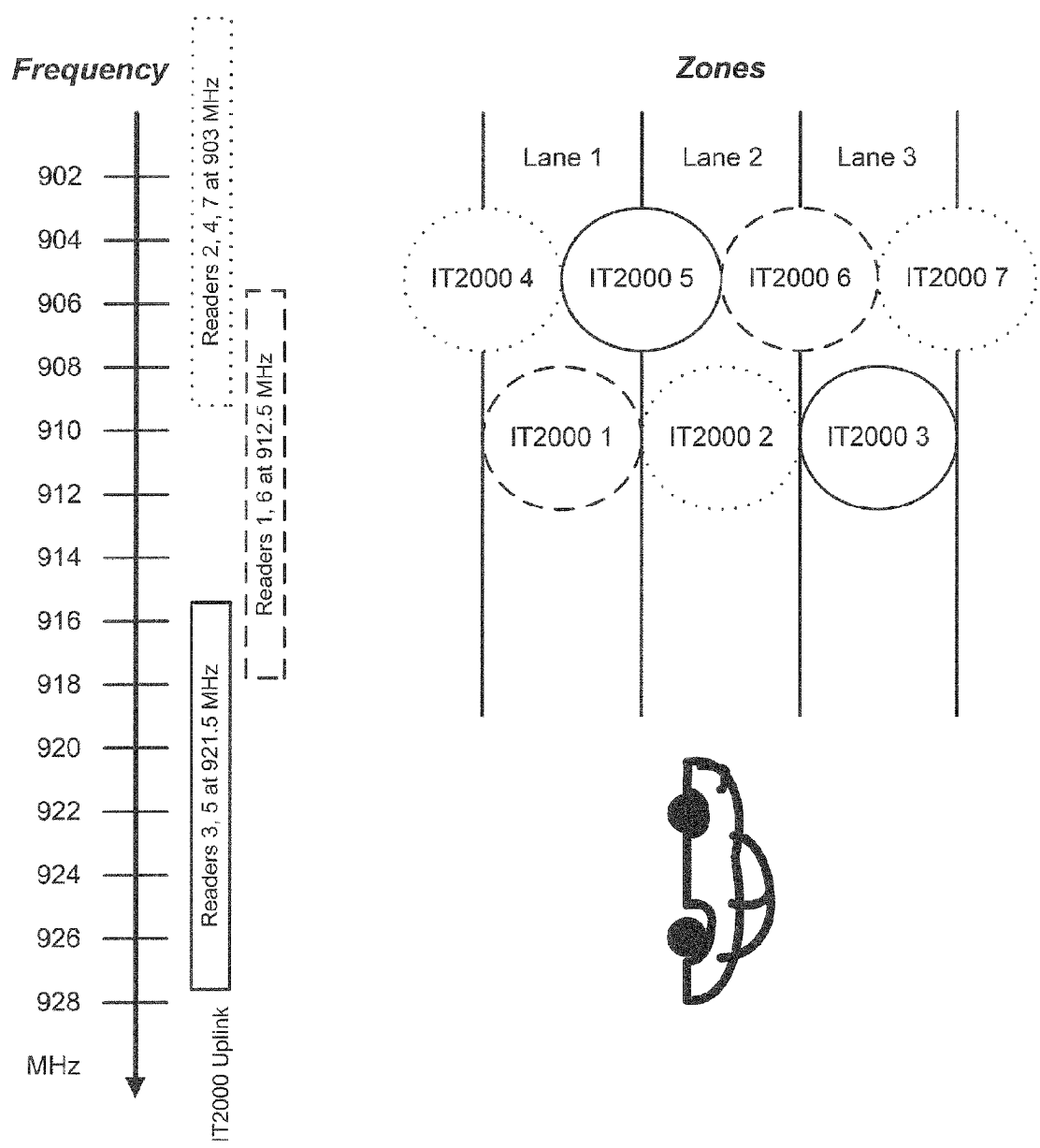
Figure 21:
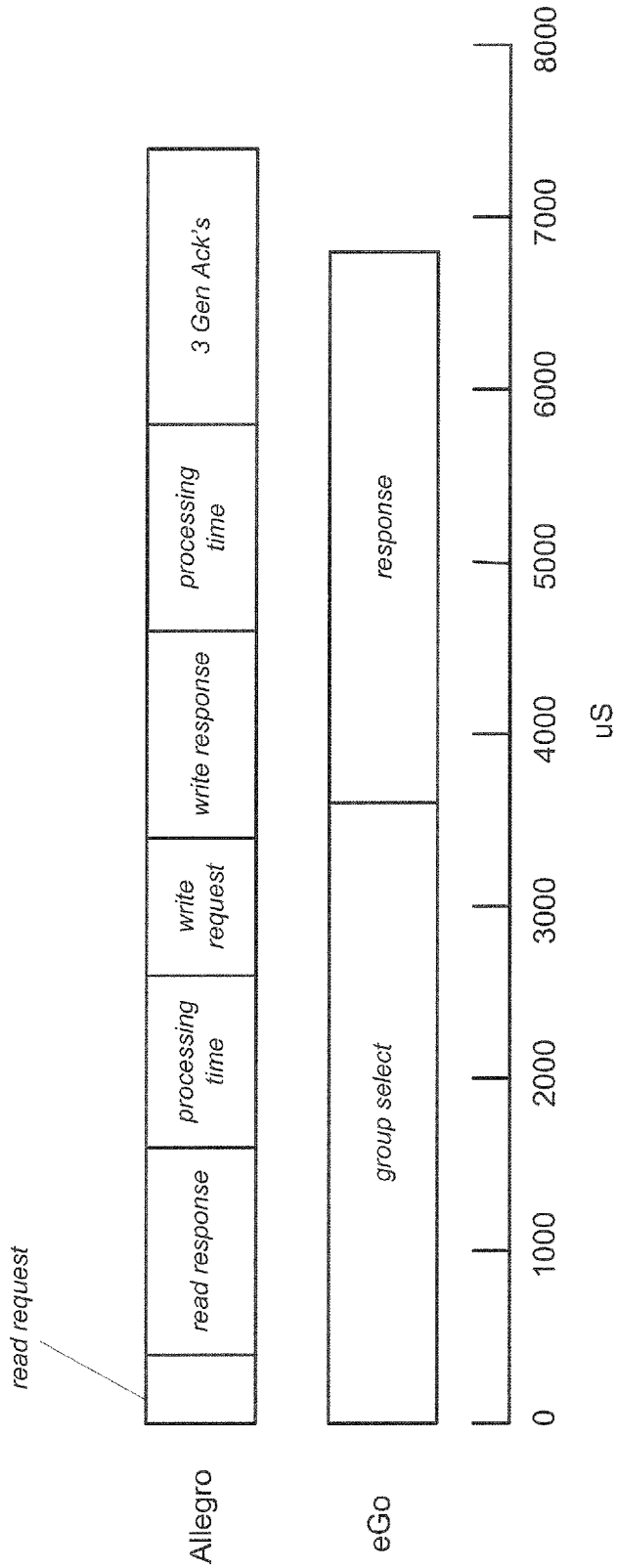

FIGS. 19-21 are another illustration of the system used with multiple backscatter protocols, namely EGO and IT2000. In the present illustration, the interrogators incorporate the capability of using either source 33, 45 as an LO in the receiver. This allows interrogators to use different frequencies for the EGO and IT2000 uplinks. Only one source needs to be modulated since the EGO and IT2000 downlinks can be on the same frequency. All of the interrogators are step-locked in time so that they are all performing the same operation at the same time. This ensures that no interrogators are transmitting while another interrogator is trying to receiving.

In addition, a frame consists of an IT2000 command set and an EGO command set. During the IT2000 command set the entire IT2000 command sequence is sent. Therefore, during one frame an IT2000 tag can be read, written to, and generally acknowledged off before the command set returns to the EGO commands. The frame is approximately 14 ms in duration covering both the EGO and IT2000 command set. In order to reduce the time required to complete the IT2000 transaction, the IT2000 transaction has been reduced to a single read, single write and three general acknowledgements.

FIG. 19 shows the spectrum requirements for the frequency plan. The blocks represent the frequency location and bandwidth required for each signal. The IT2000 signals are wider because of IT2000's faster data rate requiring more spectrum. The figure shows that the EGO signals and the IT2000 downlink signal share the same center frequency. These signals use one of the sources in the interrogator while the other source is used by the IT2000 uplink signals. The numbers in the blocks represent the different interrogators used to cover the lanes.

The IT2000 downlink and EGO uplink and downlink frequencies are spaced across the 909.75 to 921.75 MHz band. The spacing requirement is determined by the selectivity of the EGO receive filters. The narrower the EGO uplink filters, the tighter the frequencies can be spaced and the greater the number of lanes that can be supported. If the spacing can be reduced to 500 kHz between channels, this setup supports 13 interrogators. An additional two EGO interrogators could be added at 903 and 921.5, by sharing the uplink signals used by the IT2000 channels. This would give a total of 15 interrogators, or the ability to support 6 lanes and 4 shoulders.

FIG. 19 also shows a frequency plan for a 3-lane system for the IT2000 downlink and the EGO interrogators. For this implementation, each interrogator is on a different frequency to eliminate the frequency reuse issue associated with the EGO uplink. Lane discrimination is accomplished by setting the correct power levels from the interrogators. To get more lane coverage the power is increased to reduce lane coverage the power is decreased.

As shown in FIG. 20, the IT2000 uplink signals are at 903, 912.25, and 921.5. The minimum spacing for IT2000 uplink is determined by the selectivity of the IT2000 receive filters. These filters need about 6 MHz of spacing between channels. However, unlike the EGO uplink channels, the IT2000 uplink frequencies can be reused so that several interrogators can use the same channel.

FIG. 20 also shows the frequency plan for a 3-lane system for the IT2000 uplink interrogators. For this implementation, the IT2000 uplinks share three center frequencies: 903, 912.25 and 921.5. Since the IT2000 uplink channels can reuse the same frequency, those frequencies are shared over several interrogators. The figure shows one method of setting up the lanes to reduce the co-channel interference by separating interrogators that use the same frequency as far apart physically as can be accomplished.

FIG. 21 shows the timing associated with step-locking all of the interrogators together. For that system, all interrogators are locked together on the same timing. Locking the signals together ensures that no interrogator is performing downlink modulation while another interrogator is attempting to receive an uplink signal. If that were to happen, the downlink modulation could interfere with the uplink signal and block its reception.

The timing plan assumes that the IT2000 commands are reduced to a single read, a single write, and three general acknowledgements (Gen Ack). The system transmits the read request until it receives a read response and then the rest of the read, write, and gen ack commands are completed. In this method, the system completes the entire read, write, and gen ack command set each cycle. The cycle time for these commands is around 14 ms. At 100 mph a vehicle travels about 2 feet. If the read area is 10 feet deep then the system should get between 4 and 5 reads depending on when in the cycle the tag enters the capture zone.

The foregoing description and drawings should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. An interrogator system using at least a first and second protocol to read RFID transponders comprising:
   at least two transceivers, each transceiver covering a respective capture zone at a single monitoring location;
   and a synchronization circuit configured to synchronize the two transceivers to establish a first tag communication signal sequence associated with said first transceiver and a second tag communication signal sequence associated with said second transceiver,
   said first tag communication signal sequence having a first tag communication sequence first portion and a first tag communication sequence second portion
   said second tag communication signal sequence having a second tag communication sequence first portion and a second tag communication sequence second portion
   such that said at least two transceivers operate the first protocol overlapping in time with each other during said first tag communication sequence first portion and said second tag communication sequence first portion and operate the second protocol overlapping in time with each other during said first tag communication sequence second portion and said second tag communication sequence second portion;

wherein at least one of said first and second protocols reads backscatter transponders and wherein more than one command is transmitted to said backscatter transponders from at least one of said transceivers.

2. The system of claim 1 wherein said transceivers are each configured to read both active RFID transponders and backscatter RFID transponders.

3. The system of claim 2 where said transceivers are configured to read the active RFID transponders at a different frequency than a frequency at which at least one of the backscatter transponders is read.

4. The system of claim 3 wherein said capture zones overlap.

5. The system of claim 2 wherein said capture zones overlap.

6. The system of claim 1 wherein said capture zones overlap.

7. The system of claim 1 wherein one of said commands is a read of a first page of transponder data and another of said commands is a read of a second page of transponder data.

8. The system of claim 1 wherein one of said commands is a read of a page of transponder data and another of said commands is a write to a page of transponder data.

9. The system of claim 1 wherein one of said commands is a read of a page of transponder data and another of said commands requests a random number.

10. The system of claim 1 wherein three commands are transmitted to the backscatter transponder and one of said commands is a write to a page of transponder data and another of said commands is a request for a random number.

11. The system of claim 1 wherein the one of said commands is a read of a page of transponder data and another of said commands is an acknowledgement of receipt of data from the transponder.

12. The System of claim 1 wherein four commands are transmitted to the backscatter transponder wherein one of the commands is an acknowledgement receipt of data from the transponder.

13. The system of claim 1, wherein said single monitoring location is a section of a multi-lane roadway and wherein said first and second tag communication sequences are configured in part to reduce interference from downlink or uplink of one of said first and second protocols on the downlink or uplink of the other of said first or second protocols.

14. An interrogator system to read active RFID transponders and backscatter RFID transponders at a single monitoring location comprising:

at least three antennas, each antenna covering a respective capture zone at said monitoring location wherein said system is configured to establish a tag communication signal sequence, said signal sequence comprising first, second, third and fourth sequence portions, said signal sequence being arranged to enable said system to read at least one active RFID transponder in a first capture zone during said first sequence portion, to read at least one active RFID transponder in a second capture zone during a second sequence portion and to read at least one active RFID transponder in a third capture zone during said third sequence portion and wherein communication with at least two backscatter transponders during said fourth sequence portion via at least two antennas overlaps in time.

15. The system of claim 14 where the active transponders are read at a different frequency than at least one of the backscatter transponders.

16. The system of claim 15 wherein the capture zones overlap.

17. The system of claim 14 wherein the capture zones overlap.

18. The system of claim 14 where said backscatter tags are sent different commands.

19. The system of claim 18 wherein one of said commands is a read of a first page of transponder data and another of said commands is a read of a second page of transponder data.

20. The system of claim 18 wherein one of said commands is a read of a page of transponder data and another of said commands is a write to a page of transponder data.

21. The system of claim 18 wherein one of said commands is a read of a page of transponder data and another of said commands requests a random number.

22. The system of claim 18 wherein three commands are used and one of said commands is a write to a page of transponder data and another of said commands is a request for a random number.

23. The system of claim 18 wherein one of said commands is a read of a page of transponder data and another of said command is an acknowledgement of receipt of data from the transponder.

24. The System of claim 18 wherein four commands are used in communicating with the transponder wherein one of the commands is an acknowledgement receipt of data from the transponder.

25. The system of claim 14, wherein said single monitoring location is a section of a multi-lane roadway and wherein said sequence is configured in part to reduce interference from downlink or uplink of one of communications with said active or backscatter transponders on the downlink or uplink of communications with the other of said active or backscatter transponders.

* * * * *